United States Patent
Zhao et al.

(10) Patent No.: US 11,922,170 B2
(45) Date of Patent: Mar. 5, 2024

(54) SYSTEMS AND METHOD FOR BOOTUP ACTIVATION OF FIRMWARE IMAGES

(71) Applicant: Samsung Electronics Co., Ltd., Suwon-si (KR)

(72) Inventors: Jian Zhao, Hayward, CA (US); Hui-Juan Li, San Jose, CA (US); Rong Zheng, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 194 days.

(21) Appl. No.: 17/503,261

(22) Filed: Oct. 15, 2021

(65) Prior Publication Data
US 2022/0413871 A1    Dec. 29, 2022

Related U.S. Application Data

(60) Provisional application No. 63/215,981, filed on Jun. 28, 2021.

(51) Int. Cl.
*G06F 9/4401* (2018.01)
*G06F 16/11* (2019.01)
*G06F 16/178* (2019.01)
*G06F 16/182* (2019.01)

(52) U.S. Cl.
CPC .......... *G06F 9/4401* (2013.01); *G06F 16/122* (2019.01); *G06F 16/178* (2019.01); *G06F 16/182* (2019.01)

(58) Field of Classification Search
None
See application file for complete search history.

(56) References Cited

U.S. PATENT DOCUMENTS

| | | |
|---|---|---|
| 8,286,156 B2 | 10/2012 | Gavens et al. |
| 9,229,706 B2 | 1/2016 | Asnaashari |
| 9,959,125 B2 | 5/2018 | Siluvainathan et al. |
| 10,229,271 B2 | 3/2019 | Kim |
| 10,365,920 B2 | 7/2019 | Stenfort et al. |
| 2003/0135650 A1* | 7/2003 | Kano ............... G06F 11/1464 714/E11.12 |
| 2018/0188986 A1* | 7/2018 | Webster ............... G06F 3/0637 |
| 2020/0193027 A1* | 6/2020 | Wang ................... G06F 9/4411 |
| 2020/0310788 A1 | 10/2020 | Zimmer et al. |
| 2020/0341656 A1* | 10/2020 | Chawla .............. G06F 16/9027 |
| 2020/0394303 A1 | 12/2020 | Suryanarayana et al. |

OTHER PUBLICATIONS

European Extended Search Report for Application No. 22180534.4, dated Nov. 29, 2022.

* cited by examiner

*Primary Examiner* — Paul Yen
(74) *Attorney, Agent, or Firm* — Renaissance IP Law Group LLP

(57) ABSTRACT

A storage device is disclosed. The storage device may include a first storage. The first storage may include a primary firmware slot to store a first firmware, a secondary firmware slot to store a second firmware, a primary file system slot to store an existing file system, and a secondary file system slot. The storage device may include a processor configured to execute the first firmware or the second firmware. The storage device may include a second storage for user data, the second storage configured to use the existing file system. The second firmware may include a tag indicating that the second firmware is subject to bootup activation.

19 Claims, 19 Drawing Sheets

SYSTEMS AND METHOD FOR BOOTUP ACTIVATION OF FIRMWARE IMAGES

RELATED APPLICATION DATA

This application claims the benefit of U.S. Provisional Patent Application Ser. No. 63/215,981, filed Jun. 28, 2021, which is incorporated by reference herein for all purposes.

FIELD

The disclosure relates generally to storage devices, and more particularly to installing a firmware image in a storage device.

BACKGROUND

Storage devices may use firmware to power up. As part of powering up, initial hardware configuration may be performed, and other features may be loaded. Further, the internal file system may be loaded so that user data may be accessed.

But if the firmware is corrupted (for example, if one or more bits are unexpectedly changed or not readable, or if an unexpected event happens during a normal firmware update), this bootup process may fail to complete. In some situations, the storage device may end up in recursively crashing: the firmware may fail to load, the storage device may attempt to reboot, fail again, attempt again to reboot, and so on. If the bootup process fails to complete, the data on the storage device may become inaccessible. Correcting this problem may require resetting the storage device, which may result in user data loss.

A need remains to update firmware on a storage device without erasing user data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
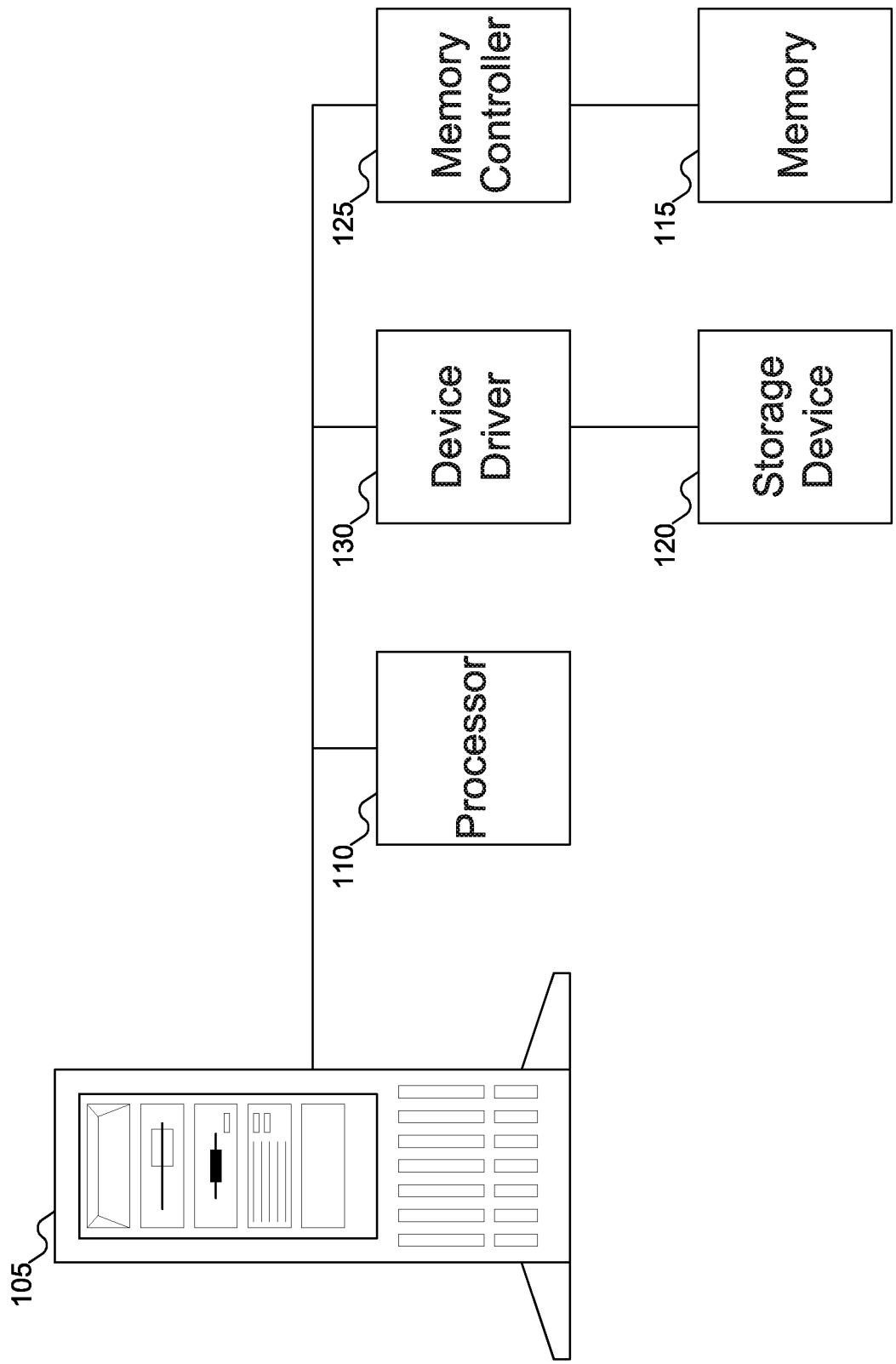
FIG. 1 shows a system including a storage device that supports bootup activation, according to embodiments of the disclosure.

Embodiments of the disclosure include a storage device that may support bootup activation. When the storage device boots, the storage device may check to see if firmware awaiting bootup activation is stored. If firmware awaiting bootup activation is found, the storage device may attempt to activate the firmware. If bootup activation is successful, the activated firmware may replace an existing firmware; otherwise, the existing firmware may replace the (unsuccessfully activated) firmware.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage devices may use firmware to initiate operations when powering up. This powering up may include initial hardware configuration of the storage device, loading of various features of the storage device, and loading of the internal file system.

If this firmware should become corrupted, the user data stored on the storage device may become inaccessible. For example, the storage device may end up in a recursive cycle: booting, failing to load the firmware, and rebooting in an attempt to fix the problem. Since the error in the firmware may not be corrected, the cycle may repeat forever (or until the user powers the storage device down).

While it may be possible to salvage the storage device by resetting the storage device to initial factory conditions, that operation may result in loss of user data. For example, if the storage device is returned to the manufacturer, the easiest solution is for the manufacturer to reset the storage device to original factory condition. But doing so may result in the loss of the internal file system and/or the erasure of all user data.

Embodiments of the disclosure enable firmware update while preserving user data. A firmware image may be loaded into a secondary firmware slot. Upon bootup, the storage device may identify the presence of this firmware in the secondary firmware slot, detect that the firmware has a flag indicating activation required, and may activate the firmware. If activation succeeds, the firmware may be copied into the primary firmware slot for future use; otherwise, the existing firmware in the primary firmware slot may be copied into the secondary firmware slot. If activation succeeds, access to the user data on the storage device may be restored.

Embodiments of the disclosure may include a tag in the firmware that may identify the firmware as supporting bootup activation. The firmware may also include a tag indicating whether bootup activation has been performed successfully (and may not need to be performed again). Embodiments of the disclosure may include storing different firmware in different firmware slots in the storage device, so that bootup activation may be attempted while retaining the existing firmware (even if the existing firmware does not boot successfully). Embodiments of the disclosure may also include multiple file system slots, so that the internal file system may be updated in one slot to support a downloaded firmware while preserving the original file system in another slot in case bootup activation fails.

FIG. 1 shows a system including an accelerator to support dictionary decoding, according to embodiments of the disclosure. In FIG. 1, machine 105, which may also be termed a host, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130. While FIG. 1 uses the generic term "storage device", embodiments of the disclosure may include any storage device formats that may benefit from the use of data quality metrics, examples of which may include hard disk drives and Solid State Drives (SSDs). Any reference to "SSD" below should be understood to include such other embodiments of the disclosure. In addition, while FIG. 1 shows one storage device 120, embodiments of the disclosure may include any number (one or more) of storage devices.

Figure 2:
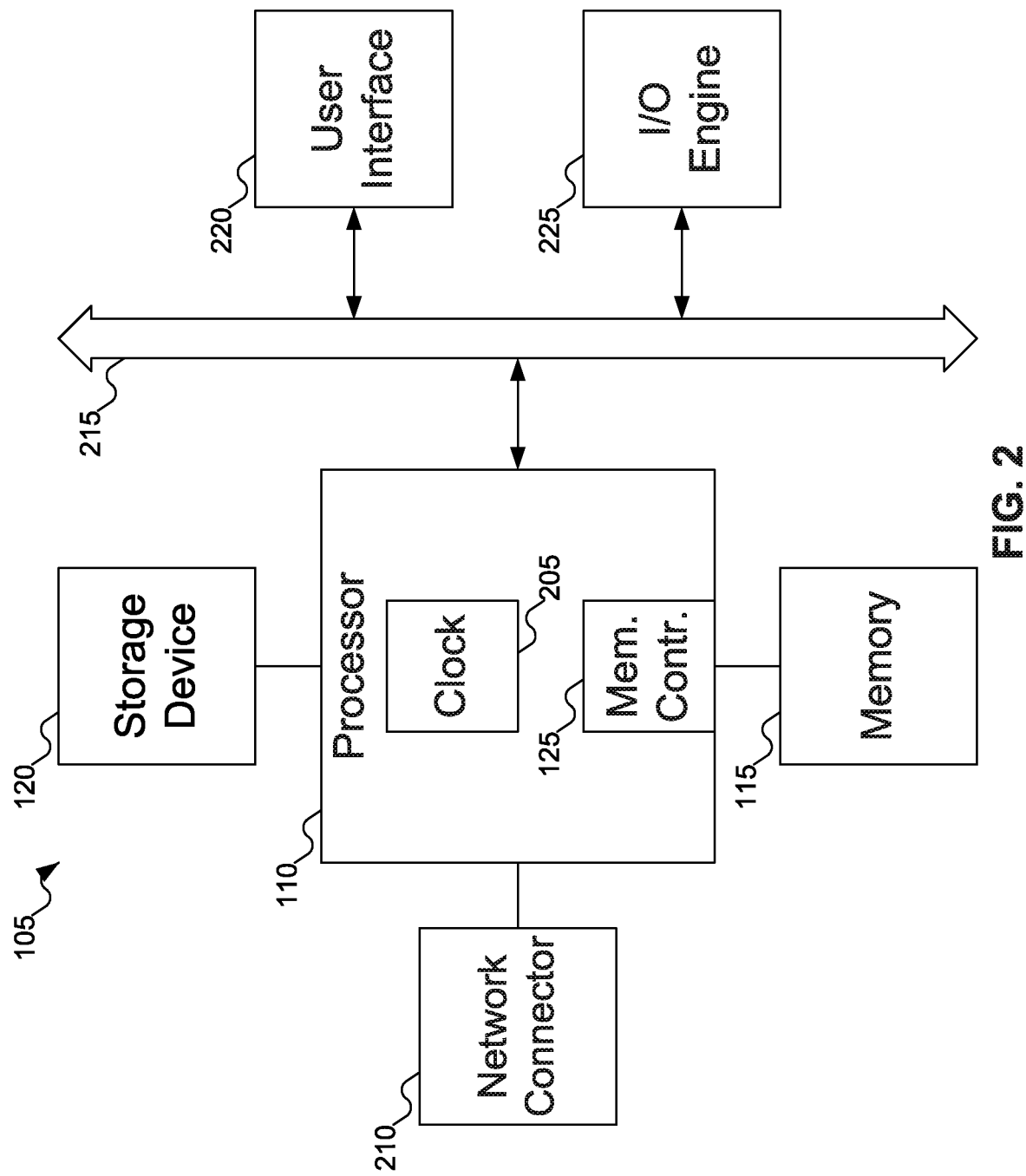
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
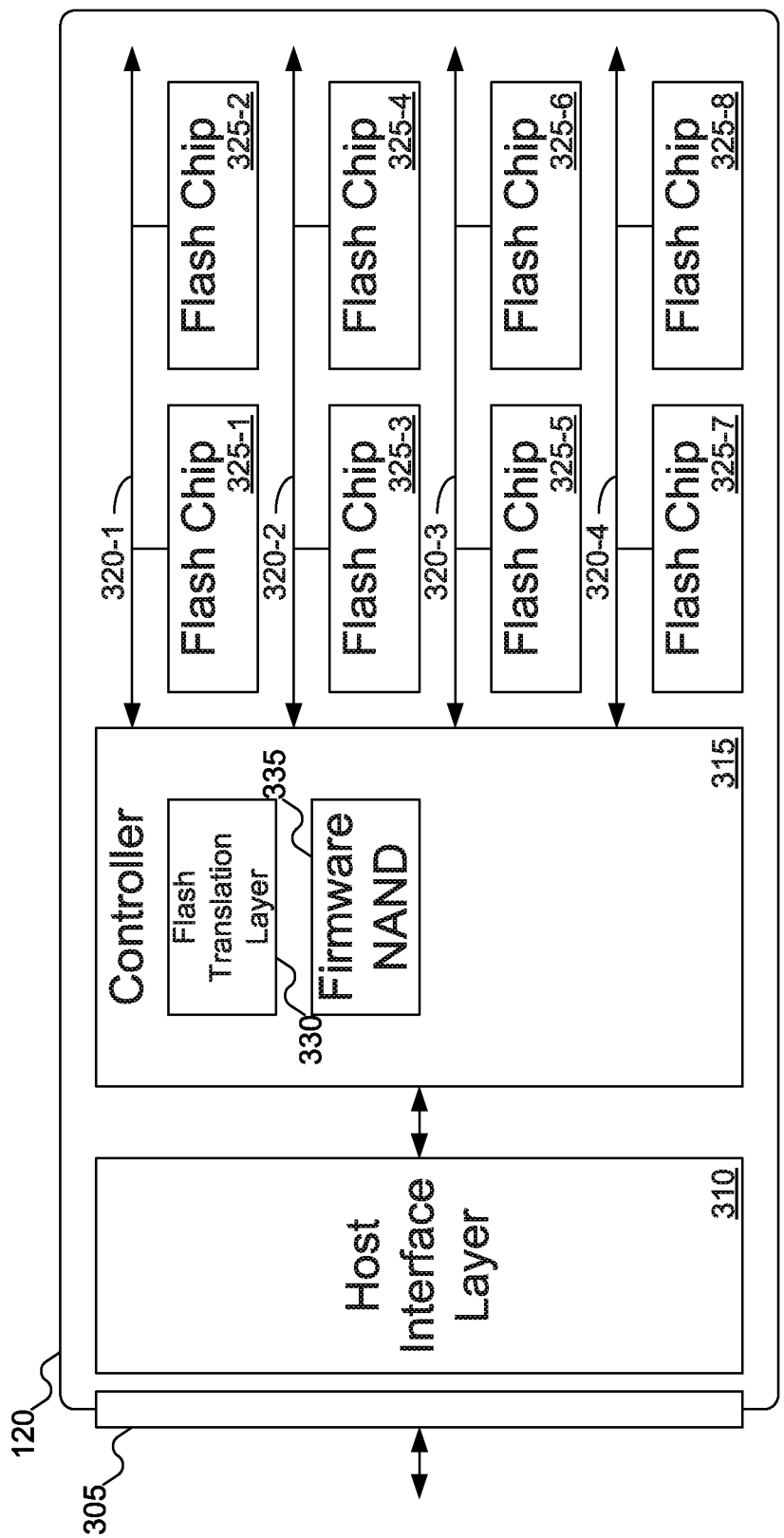
FIG. 3 shows a Solid State Drive (SSD) supporting dictionary decoding, according to embodiments of the disclosure.

FIG. 3 shows a Solid State Drive (SSD) supporting dictionary decoding, according to embodiments of the disclosure. In FIG. 3, SSD 120 may include interface 305. Interface 305 may be an interface used to connect SSD 120 to machine 105 of FIG. 1. SSD 120 may include more than one interface 305: for example, one interface might be used for block-based read and write requests, and another interface might be used for key-value read and write requests. While FIG. 3 suggests that interface 305 is a physical connection between SSD 120 and machine 105 of FIG. 1, interface 305 may also represent protocol differences that may be used across a common physical interface. For example, SSD 120 might be connected to machine 105 using a U.2 or an M.2 connector, but may support block-based requests and key-value requests: handling the different types of requests may be performed by a different interface 305.

SSD 120 may also include host interface layer 310, which may manage interface 305. If SSD 120 includes more than one interface 305, a single host interface layer 310 may manage all interfaces, SSD 120 may include a host interface layer for each interface, or some combination thereof may be used.

SSD 120 may also include SSD controller 315, various channels 320-1, 320-2, 320-3, and 320-4, along which various flash memory chips 325-1, 325-2, 325-3, 325-4, 325-5, 325-6, 325-7, and 325-8 may be arrayed. SSD controller 315 may manage sending read requests and write requests to flash memory chips 325-1 through 325-8 along channels 320-1 through 320-4. Although FIG. 3 shows four channels and eight flash memory chips, embodiments of the disclosure may include any number (one or more, without bound) of channels including any number (one or more, without bound) of flash memory chips.

While pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 230 pages, then all 230 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the disclosure, the unit of erasure may differ from the block: for example, it may be a superblock, which as discussed above may be a set of multiple blocks.)

Because the units at which data is written and data is erased differ (page vs. block), if the SSD waited until a block contained only invalid data before erasing the block, the SSD might actually run out of available storage space, even though the amount of valid data might be less than the advertised capacity of the SSD. To avoid such a situation, SSD controller 315 may include a garbage collection controller (not shown in FIG. 3, but discussed further with reference to FIG. 5 below). The function of the garbage collection may be to identify blocks that contain all or mostly all invalid pages and free up those blocks so that valid data may be written into them again. But if the block selected for garbage collection includes valid data, that valid data will be erased by the garbage collection logic (since the unit of erasure is the block, not the page). To avoid such data being lost, the garbage collection logic may program the valid data from such blocks into other blocks. Once the data has been programmed into a new block (and the table mapping logical block addresses (LBAs) to physical block addresses (PBAs) updated to reflect the new location of the data), the block may then be erased, returning the state of the pages in the block to a free state.

SSDs also have a finite number of times each cell may be written before cells may not be trusted to retain the data correctly. This number is usually measured as a count of the number of program/erase cycles the cells undergo. Typically, the number of program/erase cycles that a cell may support mean that the SSD will remain reliably functional for a reasonable period of time: for personal users, the user may be more likely to replace the SSD due to insufficient storage capacity than because the number of program/erase cycles has been exceeded. But in enterprise environments, where data may be written and erased more frequently, the risk of cells exceeding their program/erase cycle count may be more significant.

To help offset this risk, SSD controller 315 may employ a wear leveling controller (not shown in FIG. 3). Wear leveling may involve selecting data blocks to program data based on the blocks' program/erase cycle counts. By selecting blocks with a lower program/erase cycle count to program new data, the SSD may be able to avoid increasing the program/erase cycle count for some blocks beyond their point of reliable operation. By keeping the wear level of each block as close as possible, the SSD may remain reliable for a longer period of time.

SSD controller 315 may include flash translation layer (FTL) 330 (which may be termed more generally a translation layer, for storage devices that do not use flash storage) and firmware Not-And (NAND) storage 335 (which may be termed more generally a controller, for storage devices that do not use flash storage). FTL 330 may handle translation of LBAs or other logical IDs (as used by processor 110 of FIG. 1) and physical block addresses (PBAs) or other physical addresses where data is stored in flash chips 325-1 through 325-8. FTL 330, may also be responsible for relocating data from one PBA to another, as may occur when performing garbage collection and/or wear leveling. Firmware NAND 335 may store copies of firmware and other related information. While FIG. 3 shows firmware NAND 335 as using NAND storage, embodiments of the disclosure may include other forms of storage, such as Not-Or (NOR) storage.

Figure 4:
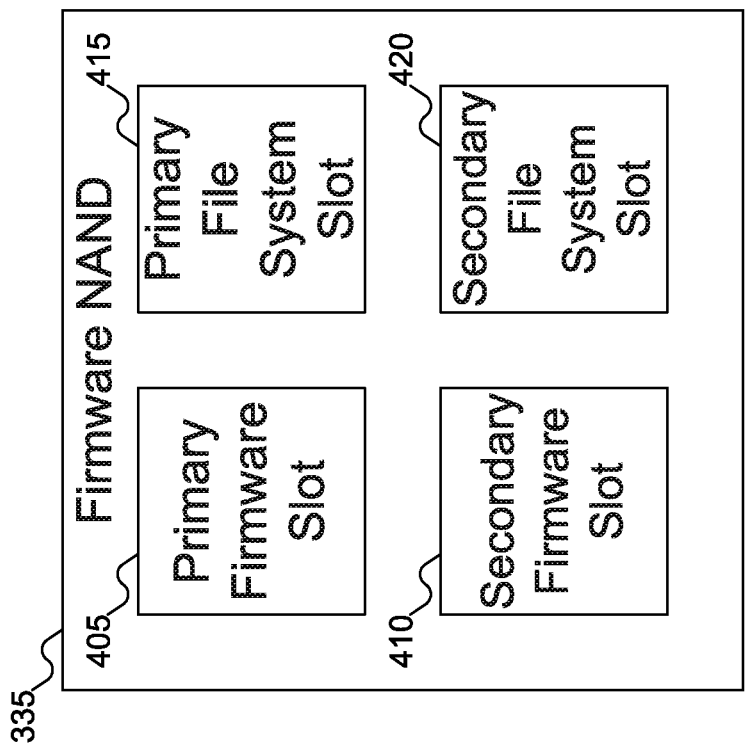
FIG. 4 shows details of the firmware Not-And (NAND) storage of FIG. 3, according to embodiments of the disclosure.

FIG. 4 shows details of firmware NAND storage 335 of FIG. 3, according to embodiments of the disclosure. In FIG. 4, firmware NAND 335 may include two firmware slots 405 and 410. Firmware slot 405 may be termed a primary firmware slot, and firmware slot 410 may be termed a secondary firmware slot. Firmware NAND 335 may include more than one storage to protect against issues that might arise from using only one firmware slot. For example, an error might occur, causing some information in primary firmware slot 405 becoming corrupted, in which case it might not be possible to read firmware from primary firmware slot 405. By including secondary firmware slot 410, it may be possible to read the firmware from secondary firmware slot 410 even if the firmware may not be successfully read from primary firmware slot 405. Thus, it may be that the firmware stored in both primary firmware slot 405 and secondary firmware slot 410 may be the same firmware.

Firmware NAND 335 may also include internal file system slots 415 and 420. There may be a distinction between an "internal file system", which manages the internal configuration of the storage device and the management/logging of files, and a "file system" that offers access to the user data space. Any reference below to "file system" should be understood to refer to the "internal file system" unless context suggests otherwise. File system slots 415 and 420 may store information about the disk configuration, debugging, and logging information used to access data from storage device 120 of FIG. 1. Like firmware slots 405 and 410, firmware NAND 335 may include secondary firmware slot 420 to protect against problems reading data from primary file system slot 415. Thus, it may be that the file system stored in both primary file system slot 415 and secondary file system slot 420 may be the same file system.

While FIG. 4 shows only two firmware slots 405 and 410 and only two file system slots 415 and 420, embodiments of the disclosure may include any number (one or more) of slots for either firmware or file system. By including more than one secondary slots, firmware NAND 335 may provide additional protection against possible read or write errors.

Figure 5:
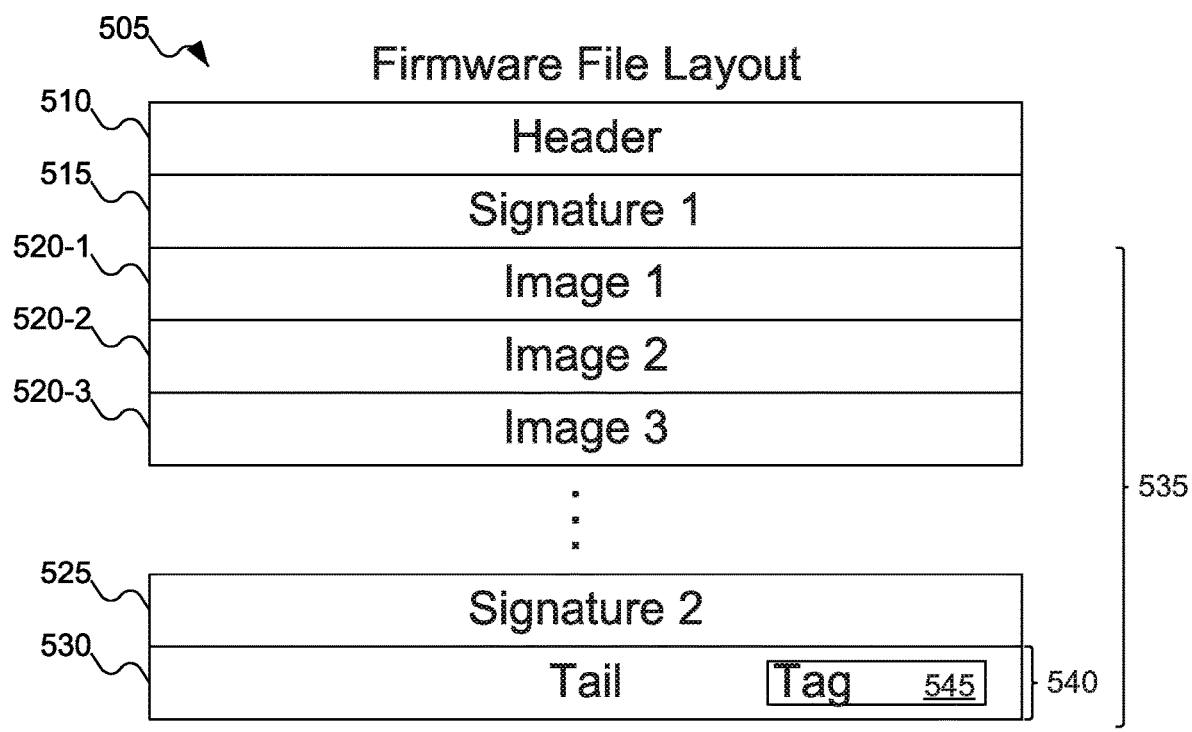
FIG. 5 shows an example layout of a firmware image, according to embodiments of the disclosure.

FIG. 5 shows an example layout of a firmware image, according to embodiments of the disclosure. In FIG. 5, firmware image 505 is shown. Firmware image 505 may include, among other elements, header 510, signature 515, images 520-1, 520-2, and 520-3, signature 525, and tail 530. Header 510 may include any header information; similarly, tail 530 may include any tail information. Images 520-1, 520-2, and 520-3 may include any desired data. While FIG. 5 shows three images 520-1, 520-2, and 520-3, embodiments of the disclosure may include any number (zero or more) of images. Images 520-1, 520-2, and 520-3 may include images to manage the FTL or another core, to control the performance or management of storage device 120 of FIG. 1 (or a core thereof), etc.

Signature 515 may be used to protect a part of firmware image 505. For example, as shown by section 535, signature 515 may be used to protect images 520-1, 520-2, and 520-3, signature 525, and tail 530. Signature 515 may be any form of signature used to protect a portion of firmware image 505. For example, signature 515 may be a signature generated using a digital signature algorithm, encryption of the firmware, or a parity code (such as a cyclic redundancy check (CRC) code. As such, the term "signature" should be understood to be includes protections other than just a digital signature.

As discussed below, portions of firmware image 505 may be changed during bootup activation of firmware image 505. If signature 515 may not be easily modified, signature 515 may be removed before firmware image 505 is stored in firmware slots 405 and/or 410 of FIG. 4. But if signature 515 may be easily modified—for example, if signature 515 is a CRC code—then signature 515 may be left in place.

Similarly, signature 525 may be used to protect a part of firmware image 505. For example, as shown by section 540, signature 525 may be used to protect tail 530. Signature 525 may be any form of signature used to protect a portion of firmware image 505. For example, signature 525 may be a signature generated using a digital signature algorithm, or a parity code (such as a cyclic redundancy check (CRC) code.

As discussed below, portions of firmware image 505 may be changed during bootup activation of firmware image 505. If signature 525 may not be easily modified, signature 525 may be removed before firmware image 505 is stored in firmware slots 405 and/or 410 of FIG. 4. But if signature 525 may be easily modified—for example, if signature 525 is a CRC code—then signature 525 may be left in place.

In FIG. 5, tail 530 is shown as including tag 545. Tag 545 may be a field that indicates whether firmware image 505 has been subject to bootup activation. For example, tag 545 may be set to 1 if firmware image 505 has not yet been activated in storage device 120 of FIG. 1, and may be changed to 0 once firmware image 505 has been activated. Tail 530 (as well as other portions of firmware image 505) may include other tags not shown in FIG. 5: for example, header 510 may include a tag indicating that firmware image 505 may be subject to bootup activation (which may differ from tag 545, which indicates whether firmware image 505 has actually be activated or not).

Before getting into the specifics of what components controller 315 of FIG. 3 may include in embodiments of the disclosure, a discussion of how controller 315 of FIG. 3 may operate may be useful. As discussed above, if storage device 120 of FIG. 1 becomes a recursive crashed disk, it may not be possible to conventionally update the existing firmware to correct the problem. A recursive crashed disk may occur, for example, when the bootrom firmware (which may be responsible for initialization of storage device 120 of FIG. 1 and the loading of the main firmware) attempts to load a main firmware that has an error. As a result, storage device 120 of FIG. 1 may reboot. But if rebooting storage device 120 of FIG. 1 does not correct the problem—as may occur if the main firmware itself stores an error—this process may repeat indefinitely, preventing storage device 120 of FIG. 1 from reaching a stage where the customer may be able to update the main firmware. If storage device 120 of FIG. 1 is returned to the manufacturer and is put in a manufacturer mode, it may be possible to update the firmware. But conventional approaches to updating the firmware in manufacturer mode may result in erasing some or all user data from storage device 120 of FIG. 1, which is undesirable.

To address this problem, when firmware image 505 is downloaded, firmware image 505 may be stored in secondary firmware slot 410 of FIG. 4, but not in primary firmware slot 405 of FIG. 4. Then, when storage device 120 of FIG. 1 is next booted (that, the next time storage device 120 of FIG. 1 has power restored, as part of an unexpected power interruption, a traditional power-down process, or a reboot of storage device 120 of FIG. 1), the bootrom firmware may detect that secondary firmware slot 410 of FIG. 4 stores a firmware that is waiting bootup activation. Then, instead of loading the firmware from primary firmware slot 405 of FIG. 4, bootrom firmware may load the firmware from secondary firmware slot 410 of FIG. 4 and may attempt to activate that firmware.

Activating the firmware in secondary firmware slot 410 of FIG. 4 may involve verifying that the firmware is correct. Activating the firmware in secondary firmware slot 410 of FIG. 4 may also involve making updates to the file system of storage device 120 of FIG. 1. Updating the file system may be necessary to support the firmware in secondary firmware slot 410 of FIG. 4. This update of the file system may include modifying some files: for example, to updated file formats appropriate to the updated file system.

If the firmware in secondary firmware slot 410 of FIG. 4 is successfully activated, then the activated firmware may be copied into primary firmware slot 405 of FIG. 4, so that the firmware may be used at the next bootup. Further, the firmware in secondary firmware slot 410 of FIG. 4 (and also in primary firmware slot 405 of FIG. 4) may be modified to reflect that the firmware has been successfully activated: for example, by modifying the value of tag 545. By modifying tag 545, the bootrom firmware will recognize that the firmware has already been activated and not attempt bootup activation of the firmware again. After tag 545 is modified, the activated firmware may be copied into primary firmware slot 405 of FIG. 4, so that the firmware may be used at the next bootup. Also, after the firmware successfully is activated, secondary file system slot 420 of FIG. 4 may be copied to primary file system slot 415 of FIG. 4.

On the other hand, if the firmware in secondary firmware slot 410 of FIG. 4 is not successfully activated, then the existing firmware in primary firmware slot 405 of FIG. 4 may continue to be used. Storage device 120 of FIG. 1 may copy the firmware from primary firmware slot 405 of FIG. 4 into secondary firmware slot 410 of FIG. 4, so that further bootup activation of the firmware is not attempted. Note that if the firmware in primary firmware slot 405 of FIG. 4 has an error, the failure to successfully activate the firmware in secondary firmware slot 410 of FIG. 4 may not correct this error, but neither is storage device 120 of FIG. 1 worse off for attempting the repair. That is, if the firmware stored in secondary firmware slot 410 of FIG. 4 could not be successfully activated, storage device 120 of FIG. 1 may still be made usable by resetting storage device 120 of FIG. 1 to factory conditions (albeit at the potential cost of losing some or all of the user data stored on storage device 120 of FIG. 1).

Figure 6:
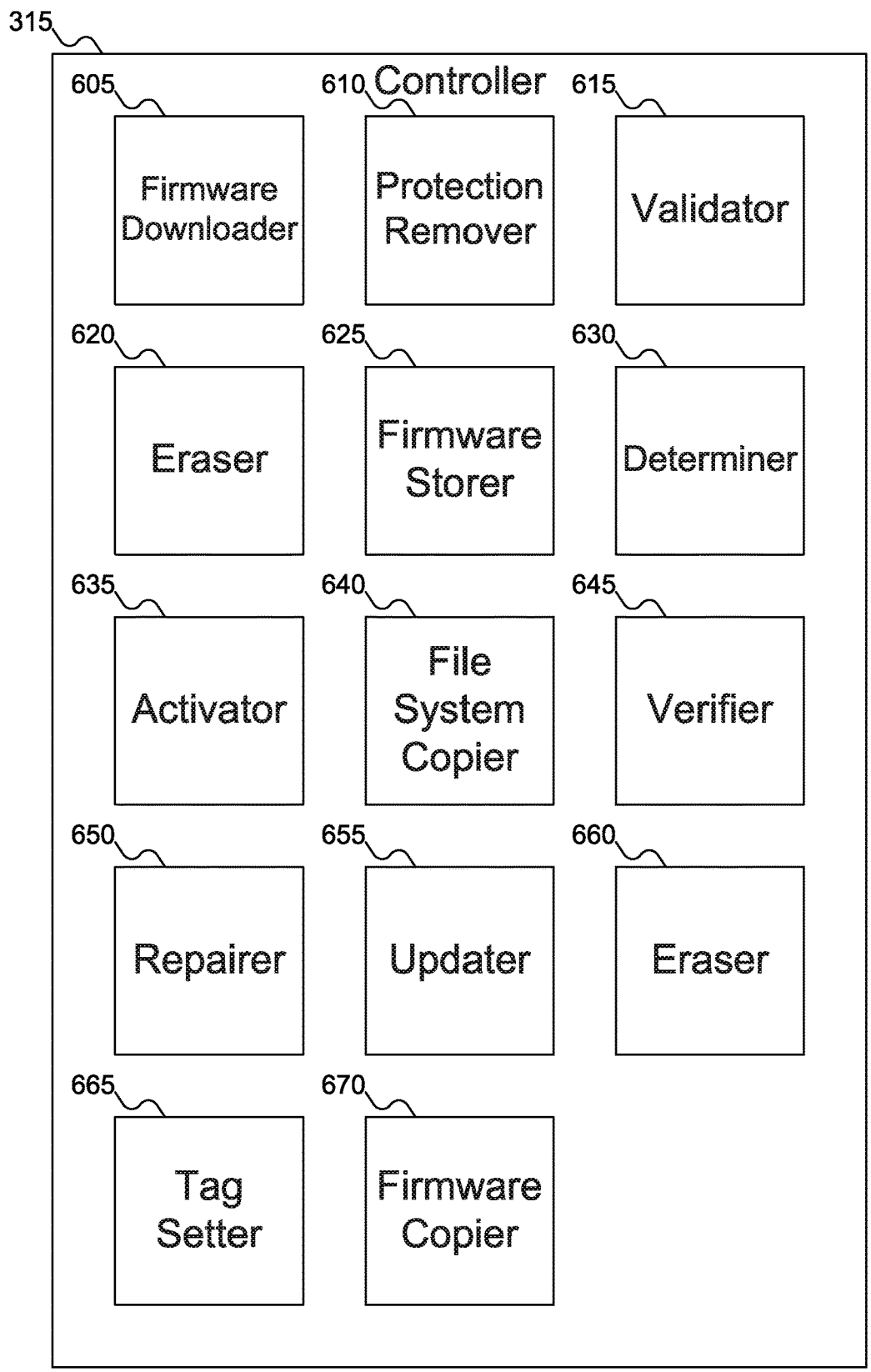
FIG. 6 shows details of the SSD controller of FIG. 3, according to embodiments of the disclosure.

FIG. 6 shows details of controller 315 of FIG. 3, according to embodiments of the disclosure. In FIG. 6, various modules of controller 315 are shown Any and/or all of these modules may be implemented using hardware, such as a Field Programmable Gate Array (FPGA), an Application-Specific Integrated Circuit (ASIC), a central processing unit (CPU), a graphics processing unit (GPU), a general purpose GPU (GPGPU), or a Tensor processing unit (TPU), to name some possibilities. Any and/or all of these modules may also be implemented using software running on appropriate hardware. Embodiments of the disclosure are intended to cover all such variations.

Firmware downloader 605 may be used to download firmware images. Firmware downloader 605 may be used either as part of the main-to-main firmware, which operates to download firmware updates as part of the normal operation of storage device 125 of FIG. 1, or firmware downloader 605 may be used to download a firmware image when storage device 125 of FIG. 1 is in manufacturer mode.

Protection remover 610 may be used to remove a protection applied to firmware downloaded by firmware downloader 605. For example, as discussed above with reference to FIG. 5, signature 515 of FIG. 5 may be used to protect various other portions of firmware image 505 of FIG. 5: for example, images 520-1, 520-2, and 520-3 of FIG. 5, signature 525 of FIG. 5, or tail 530 of FIG. 5. If a signature (or other protection) might not be modified when firmware image 505 of FIG. 5 is modified—for example, if changing the value associated with tag 545 of FIG. 5 would result in changing the value of signatures 515 and/or 525 of FIG. 5, but signatures 515 and/or 530 of FIG. 5 are not modifiable (or not easily modified—then protection remover 610 may be used to remove the protection. In that manner, data in firmware image 505 of FIG. 5 may then be modified without creating a problem with any protection applied to firmware image 505 of FIG. 5.

Validator 615 may be used to validate that firmware image 505 of FIG. 5 is correct. For example, validator 615 may verify that any signatures or other protection applied to firmware image 505 of FIG. 5 are correct for firmware image 505 of FIG. 5. Note that the operation of validator 615 may precede activation of firmware image 505 of FIG. 5, since validation may occur before firmware image 505 of FIG. 5 is stored in secondary firmware slot 410 of FIG. 4.

Eraser 620 may be used to erase information from firmware slots 405 and/or 410 of FIG. 4, prior to storing firmware image 505 of FIG. 4 in either slot. For example, as discussed above, it might be necessary to erase flash memory before new data may be written to flash memory. Erase 620 may be used to perform this erasure to permit firmware image 505 of FIG. 5 to be written to firmware slots 405 and/or 410 of FIG. 4. Once firmware slots 405 and/or 410 of FIG. 4 are erased, then firmware storer 625 may be used to store firmware image 505 of FIG. 5 into firmware slots 405 and/or 410 of FIG. 4.

Determiner 630 may determine whether the firmware in secondary firmware slot 410 of FIG. 4 is tagged for bootup activation. For example, determiner 630 may examine firmware image 505 of FIG. 5 for tag 545 of FIG. 5 and, upon determining that tag 545 of FIG. 5 is set to indicate that firmware image 505 of FIG. 5 awaits bootup activation, use that information to try and activate the firmware stored in secondary firmware slot 410 of FIG. 4. Activator 635 may then perform the activation of the firmware in secondary firmware slot 410 of FIG. 4.

As part of activation, file system copier 640 may copy a file system from primary file system slot 415 of FIG. 4 to secondary file system slot 420 of FIG. 4. In this manner, updates to the file system that may be needed to support the firmware may be performed on the copy of the file system in secondary file system slot 420 of FIG. 4: if the activation of the firmware does not succeed, then the original file system in primary file system slot 415 of FIG. 4 may remain in place, so that the file system may still be used if possible. File system copier 640 may also copy the updated file system from secondary file system slot 420 of FIG. 4 to primary file system slot 415 of FIG. 4 upon successful activation of the firmware in secondary firmware slot 410 of FIG. 4, or may copy the existing file system from primary file system slot 415 of FIG. 4 to secondary file system slot 420 of FIG. 4 if activation of the firmware in secondary file system slot 410 of FIG. 4 fails.

Verifier 645 may be used to verify that the file system in either primary file system slot 415 of FIG. 4 or secondary file system slot 420 of FIG. 4 is correct: that is, the file system is not corrupted. If the file system in either primary file system slot 415 of FIG. 4 or secondary file system slot 420 of FIG. 4 is corrupted, then repairer 650 of FIG. 5 may repair the corruption, if possible.

Once the file system in secondary file system slot 420 of FIG. 4 is known to be correct (either not corrupted or repaired), updater 655 may update the file system in secondary file system slot 420 of FIG. 4 to be consistent with the firmware in secondary firmware slot 410 of FIG. 4.

Regardless of whether the file system in secondary file system slot 420 of FIG. 4 is without corruption, repaired, or unrepairable, and regardless of whether the file system in secondary file system slot 420 of FIG. 4 was successfully updated to be consistent with the firmware in secondary firmware slot 410 of FIG. 4, eraser 660 may erase one of file system slots 415 and/or 420 of FIG. 4, so that file system copier 640 may then copy the file system from one of file system slots 415 or 420 of FIG. 4 to the other. For example, if the file system is not corrupted or was repairable and is successfully updated, then eraser 660 may erase the information in primary file system slot 415 of FIG. 4 and file system copier 640 may copy the updated file system from secondary file system slot 420 of FIG. 4 to primary file system slot 415 of FIG. 4. Otherwise, if the file system was corrupted and could not be repaired, or if the file system could not be updated successfully, erase 660 may erase the information in secondary file system slot 420 of FIG. 4 and file system copier 640 may copy the file system from primary file system slot 415 of FIG. 4 to secondary file system slot 420 of FIG. 4. Note that functionally, eraser 660 is likely identical to eraser 620 (in that both erase data from a slot), and one module may perform both functions.

If bootup activation of the firmware in secondary firmware slot 410 of FIG. 4 is successful, then tag setter 665 may update tag 545 of FIG. 5 to reflect the successful bootup activation of the firmware in secondary firmware slot 410 of FIG. 4. Eraser 620 may then be used to erase one of firmware slots 405 or 410 of FIG. 4, and firmware copier 670 may copy a firmware from one of firmware slots 405 or 410 of FIG. 4 to the other. For example, if the firmware in secondary firmware slot 410 of FIG. 4 is successfully activated, then eraser 620 may erase the information in primary firmware slot 405 of FIG. 4 and firmware copier 670 may copy the firmware from secondary firmware slot 410 of FIG. 4 into primary firmware slot 405 of FIG. 4. Otherwise, if the firmware in secondary firmware slot 410 of FIG. 4 is not successfully activated, then eraser 620 may erase the information in secondary firmware slot 410 of FIG. 4 and firmware copier 670 may copy the firmware from primary firmware slot 405 of FIG. 4 into secondary firmware slot 410 of FIG. 4. Note that functionally, firmware copier 670 is likely identical to file system copier 640 (in that both copy data from one slot to another), and one module may perform both functions.

Figure 7:
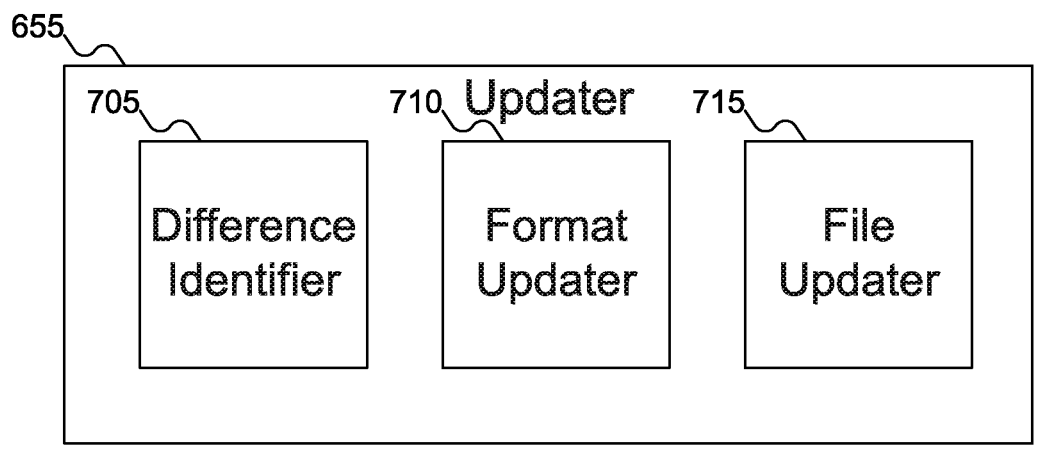
FIG. 7 shows details of the updater of FIG. 6, according to embodiments of the disclosure.

FIG. 7 shows details of updater 655 of FIG. 6, according to embodiments of the disclosure. In FIG. 7, updater 655 is shown as including difference identifier 705, format updater 710, and file updater 715. Difference identifier 705 may identify a difference between the file system in primary file system slot 415 of FIG. 4 (the "existing file system") and the file system in secondary file system slot 420 of FIG. 4 (the "updated file system"). Format updater 710 may then update a format used to store information in the updated file system, and file updater 715 may then update a file of the updated file system.

Figure 8A:
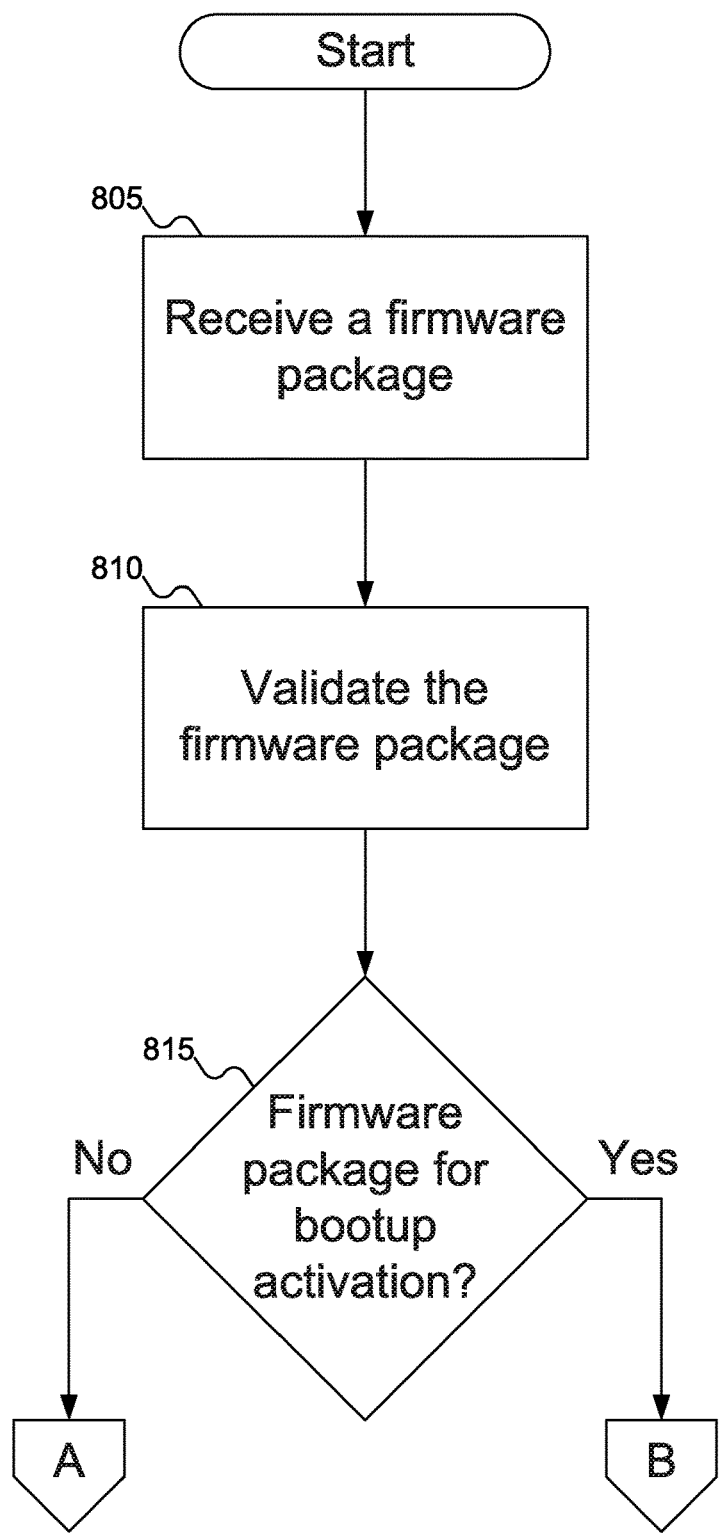
FIG. 8A shows a flowchart of an example procedure for the storage device of FIG. 1 to download and activate a firmware image, according to embodiments of the disclosure.
Figure 8B:
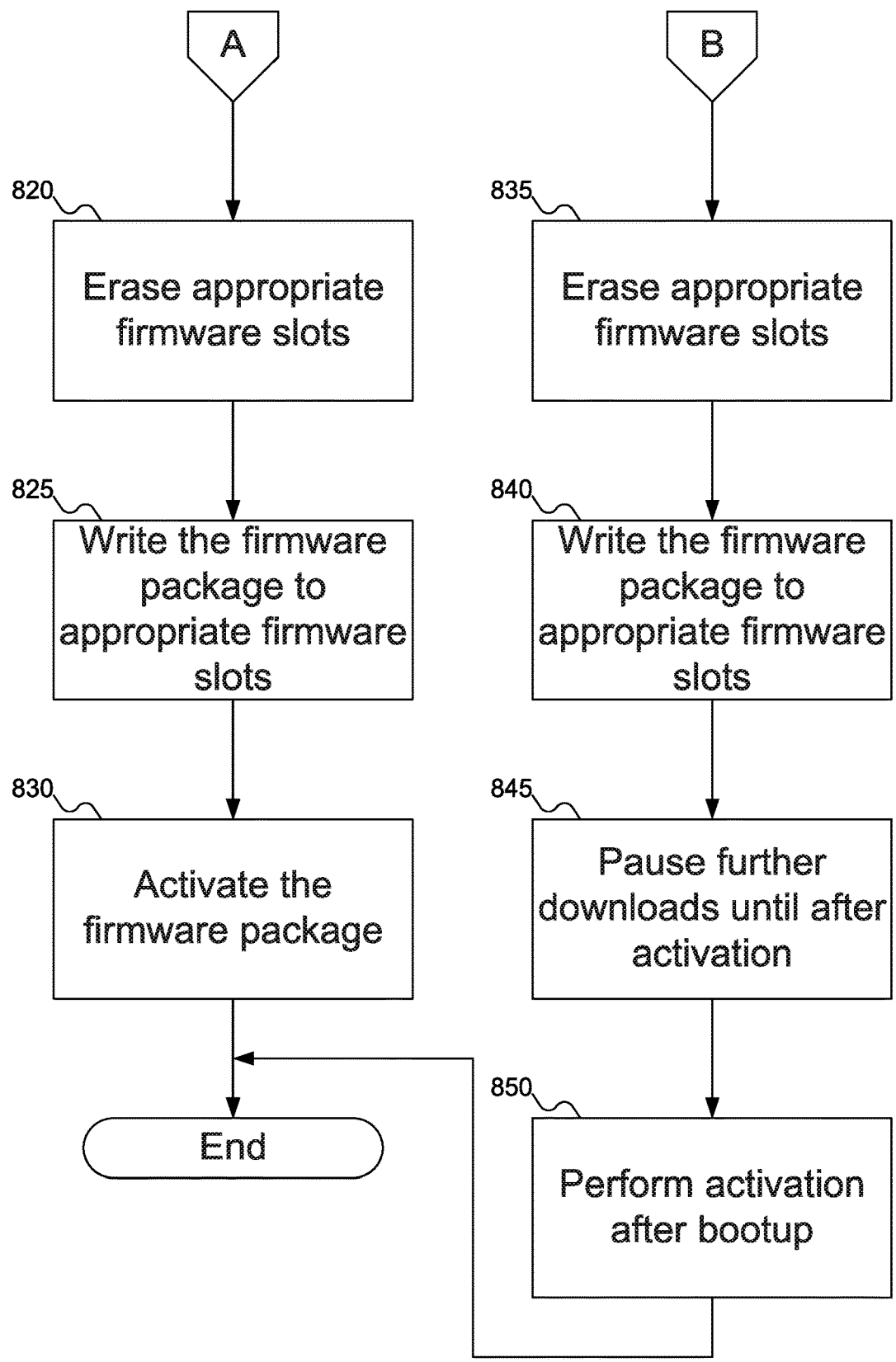
FIG. 8B continues the flowchart of the example procedure for the storage device of FIG. 1 to download and activate a firmware image, according to embodiments of the disclosure.

FIGS. 8A-8B show a flowchart of an example procedure for storage device 120 of FIG. 1 to download and activate a firmware image, according to embodiments of the disclosure. In FIG. 8A, at block 805, firmware downloader 605 of FIG. 6 may receive a firmware package/firmware image. At block 810, validator 615 of FIG. 6 may validate the firmware package. At block 815, determiner 630 of FIG. 6 may determine whether the firmware package is eligible for bootup activation.

If the firmware package is not eligible for bootup activation, then at block 820 (FIG. 8B), eraser 620 of FIG. 6 may erase firmware slots 405 and/or 410 of FIG. 4. At block 825, firmware storer 625 of FIG. 6 may store the firmware package in one or more of firmware slots 405 and/or 410 of FIG. 4. Finally, at block 830, the firmware package may be considered to be activated.

If the firmware package is eligible for bootup activation, then at block 835, eraser 620 of FIG. 6 may erase appropriate firmware slots, such as secondary firmware slot 410 of FIG. 4 (leaving primary firmware slot 405 of FIG. 4 alone). At block 840, firmware storer 625 of FIG. 6 may store the firmware package in the appropriate firmware slots, such as secondary firmware slot 410 of FIG. 4. At block 845, controller 315 of FIG. 3 may pause any further downloads (which may have been scheduled by the main firmware downloader) until after bootup activation completes. Finally, at block 850, controller 315 of FIG. 3 may perform bootup activation of the firmware package after storage device 120 of FIG. 1 next boots.

Figure 9A:
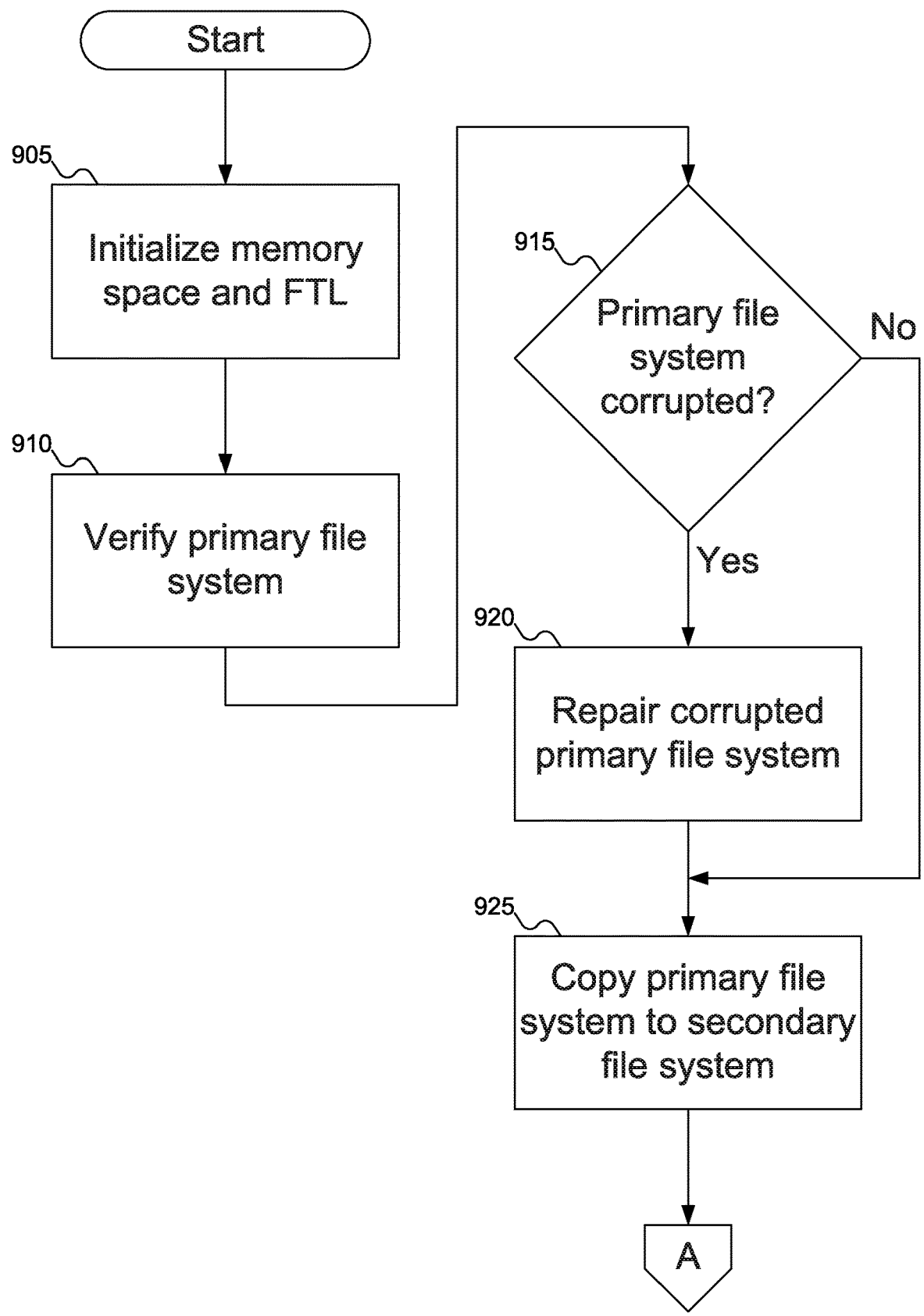
FIG. 9A shows a flowchart of an example procedure for the storage device of FIG. 1 to activate a firmware image, according to embodiments of the disclosure.
Figure 9B:
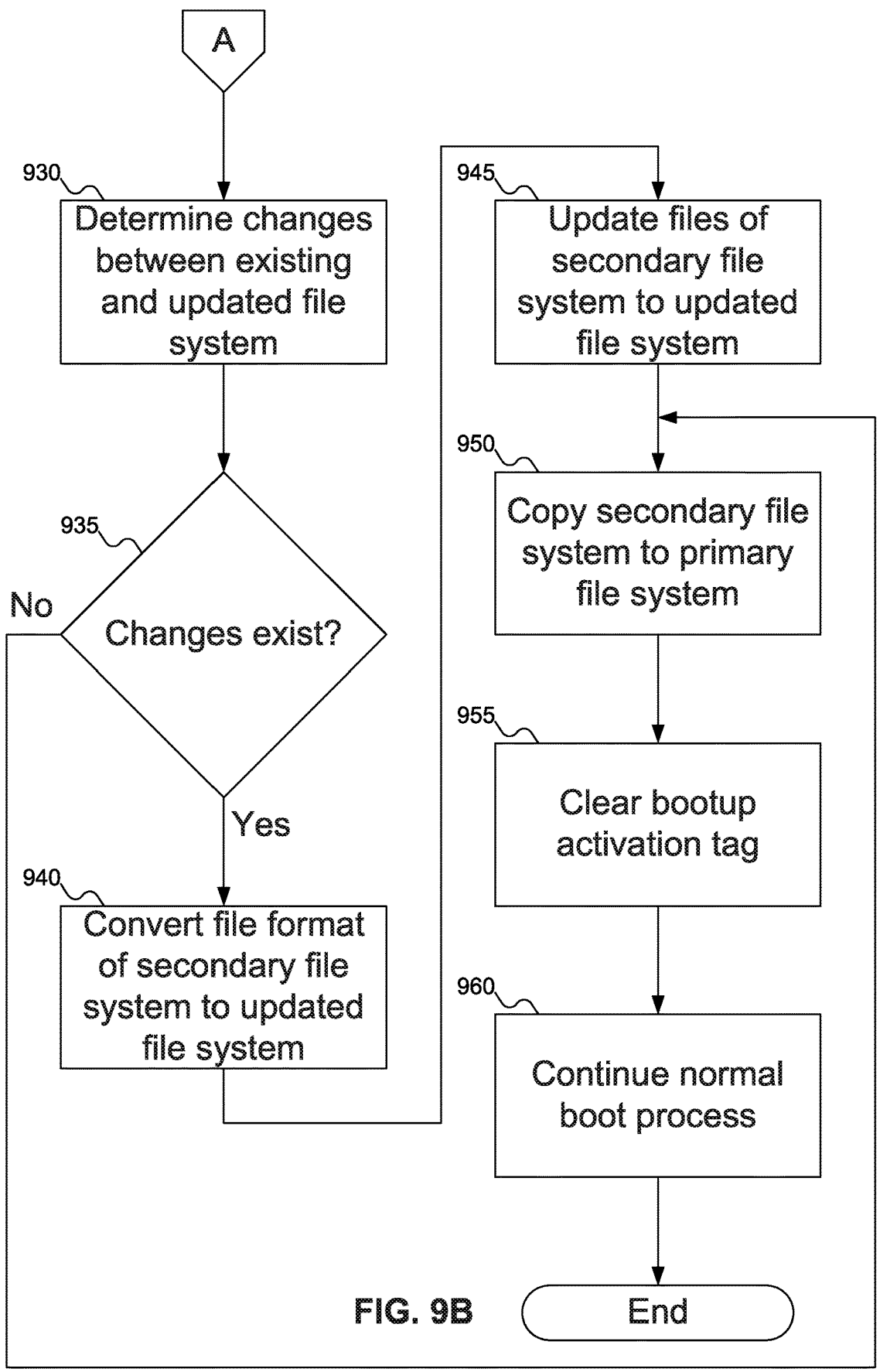
FIG. 9B continues the flowchart of an example procedure for the storage device of FIG. 1 to activate a firmware image, according to embodiments of the disclosure.

FIGS. 9A-9B show a flowchart of an example procedure for storage device 120 of FIG. 1 to activate a firmware image, according to embodiments of the disclosure. In FIG. 9A, at block 905, controller 315 of FIG. 3 may initialize storage device 120 of FIG. 1 as part of normal bootup operations. At block 910, verifier 645 of FIG. 6 may verify that the primary file system is not corrupted. If, at block 915, if it turns out that the primary file system is corrupted, then at block 920, repairer 650 of FIG. 6 may repair the primary file system. Once the primary file system is repaired (assuming the primary file system needed repair), at block 925, file system copier 640 of FIG. 6 may copy the file system from primary file system slot 415 of FIG. 4 to secondary file system slot 420 of FIG. 4, at which time storage device 120 of FIG. 1 may be configured to use the file system from secondary file system slot 420 of FIG. 4.

At block 930 (FIG. 9B), difference identifier 705 of FIG. 7 may determine what differences exist between the existing file system and the updated file system supported by the firmware package. At block 935, controller 315 of FIG. 3 may determine if any differences exist. If there are any differences, then at block 940 format updater 710 of FIG. 7 may convert a file format of the file system in secondary file system slot 420 of FIG. 4 to a file format of the updated file system, and at block 945 file updater 715 of FIG. 7 may update one or more files of the file system in secondary file system slot 420 of FIG. 4 to the updated file system.

At block 950, once the file system has been updated, file system copier 640 of FIG. 6 may copy the file system from secondary file system slot 420 of FIG. 4 to primary file system slot 415 of FIG. 4, at which time storage device 120 of FIG. 1 may be configured to use the file system from primary file system slot 420 of FIG. 4. Finally, at block 955, tag setter 665 of FIG. 6 may update tag 545 of FIG. 5 to reflect that firmware image 505 of FIG. 5 has been subject to bootup activation (and should not be activated again), and at block 960 storage device 120 of FIG. 1 may continue the normal boot process.

Figure 10:
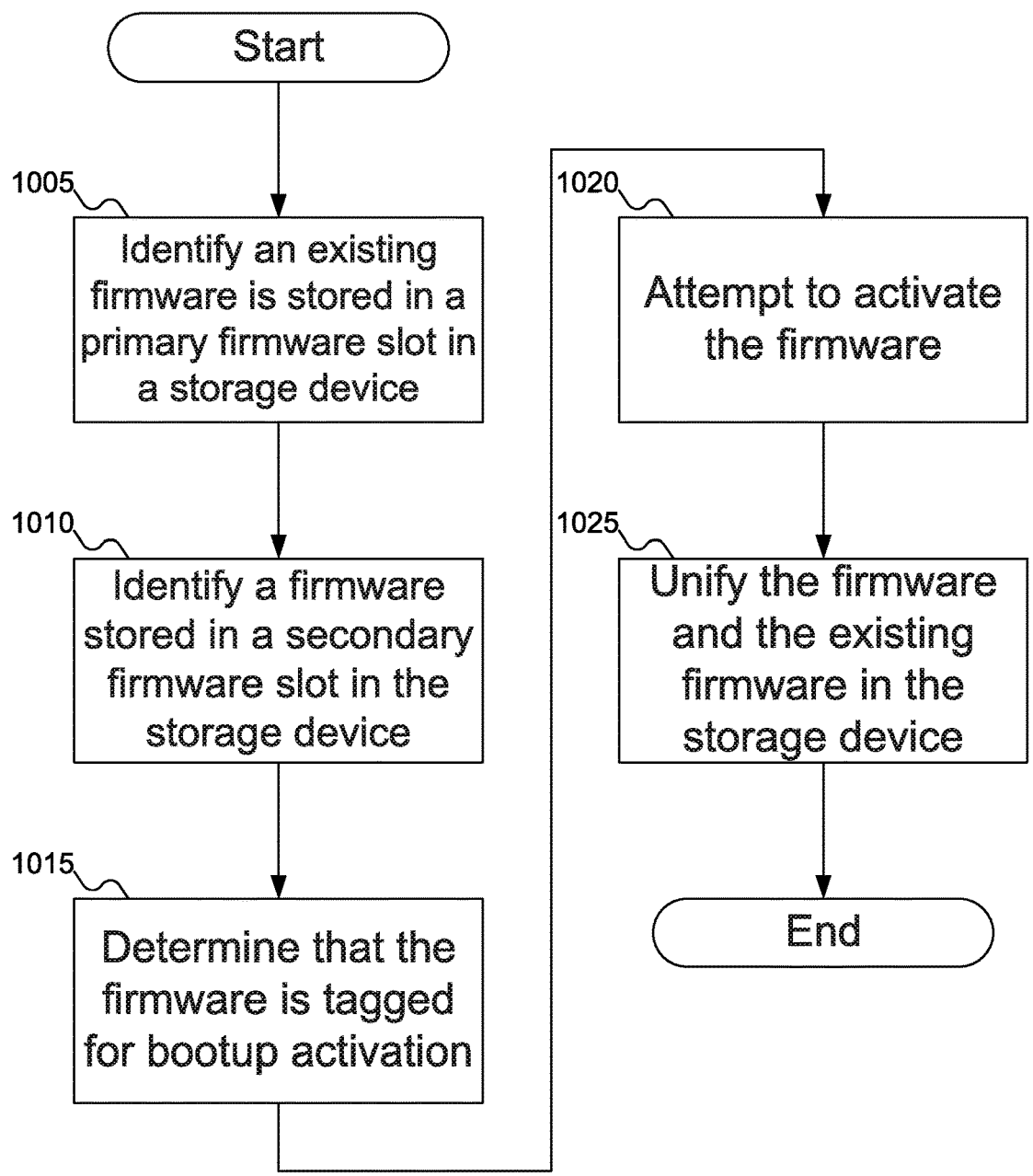
FIG. 10 shows an alternative flowchart of an example procedure for the storage device of FIG. 1 to download and activate a firmware image, according to embodiments of the disclosure.

FIG. 10 shows an alternative flowchart of an example procedure for storage device 120 of FIG. 1 to download and activate a firmware image, according to embodiments of the disclosure. At block 1005, the bootrom firmware may determine that there is an existing firmware stored in primary firmware slot 405 of FIG. 4. At block 1010, the bootrom firmware may determine that there is a firmware stored in secondary firmware slot 410 of FIG. 4. At block 1015, determiner 630 of FIG. 6 may determine that the firmware in secondary firmware slot 410 of FIG. 4 is tagged for bootup activation. At block 1020, activator 635 of FIG. 6 may attempt to activate the firmware in secondary firmware slot 1020. Finally, at block 1025, controller 315 of FIG. 3 may unify the firmware and the existing firmware in primary and secondary firmware slots 405 and 410 of FIG. 4. In this context, "unify" is intended to mean copying one firmware from one firmware slot 405 or 410 of FIG. 4 into the other firmware slot 405 or 410 of FIG. 4: which firmware is copied may depend on whether the firmware in secondary firmware slot 410 of FIG. 4 is successfully activated.

Figure 11:
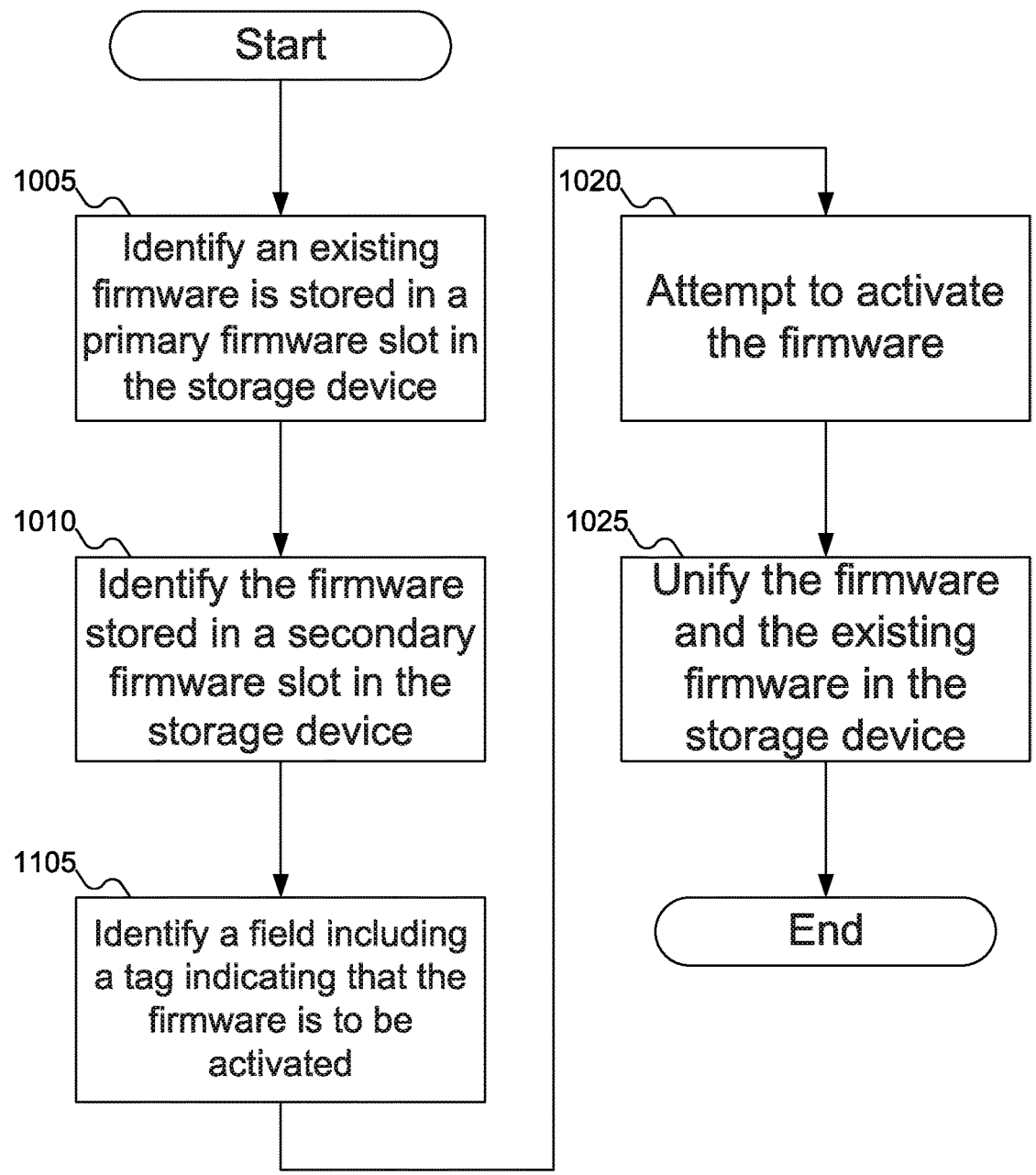
FIG. 11 shows yet another alternative flowchart of an example procedure for the storage device of FIG. 1 to download and activate a firmware image, according to embodiments of the disclosure.

FIG. 11 shows yet another alternative flowchart of an example procedure for storage device 120 of FIG. 1 to download and activate a firmware image, according to embodiments of the disclosure. FIG. 11 is similar to FIG. 10, but more general. At block 1005, the bootrom firmware may determine that there is an existing firmware stored in primary firmware slot 405 of FIG. 4. At block 1010, the bootrom firmware may determine that there is a firmware stored in secondary firmware slot 410 of FIG. 4. At block 1105, determiner 630 of FIG. 6 may determine that the firmware in secondary firmware slot 410 of FIG. 4 is tagged for bootup activation by identifying tag 545 of FIG. 5 as indicating that the firmware is to be activated. At block 1020, activator 635 of FIG. 6 may attempt to activate the firmware in secondary firmware slot 1020. Finally, at block 1025, controller 315 of FIG. 3 may unify the firmware and the existing firmware in primary and secondary firmware slots 405 and 410 of FIG. 4. In this context, "unify" is intended to mean copying one firmware from one firmware slot 405 or 410 of FIG. 4 into the other firmware slot 405 or 410 of FIG. 4: which firmware is copied may depend on whether the firmware in secondary firmware slot 410 of FIG. 4 is successfully activated.

Figure 12A:
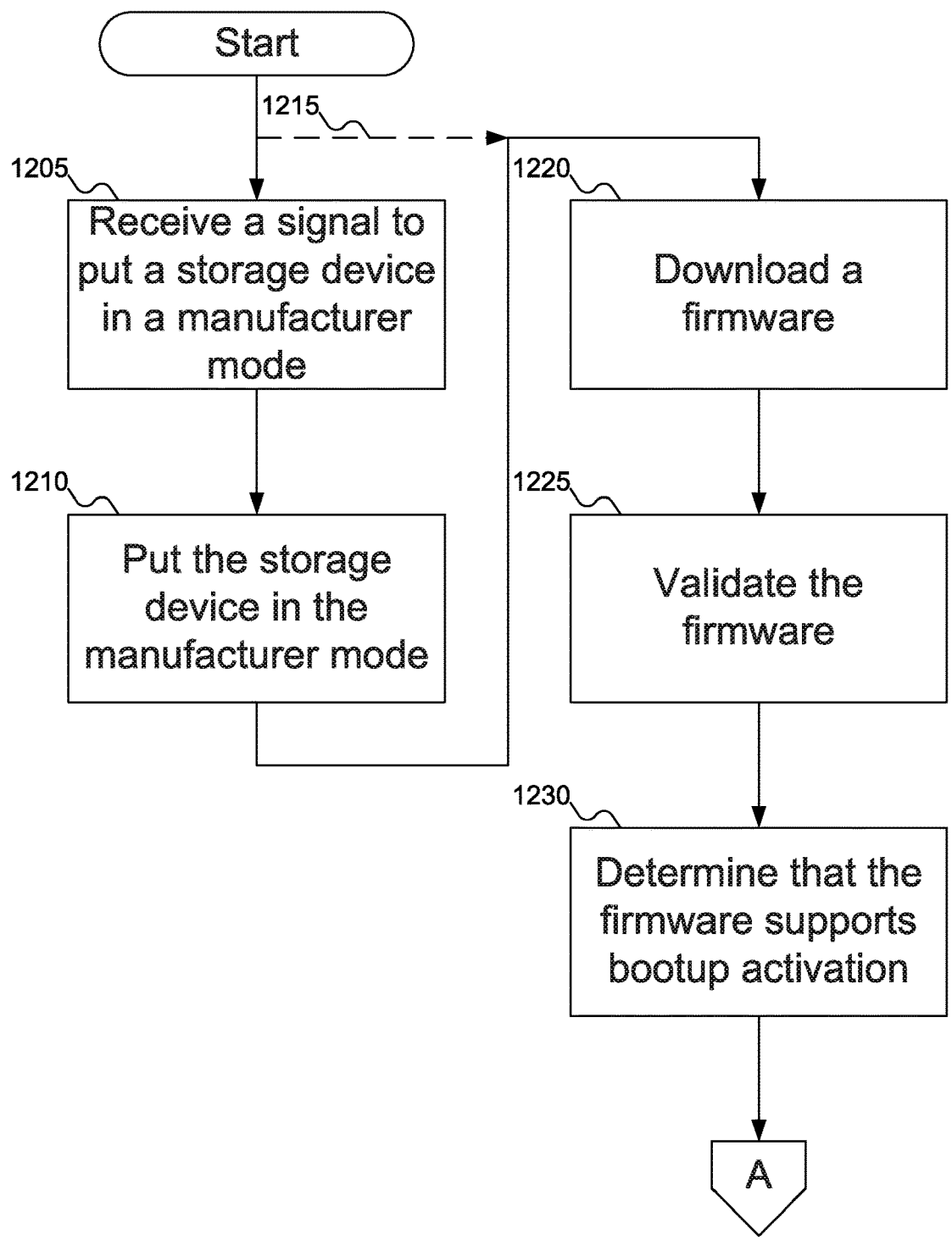
FIG. 12A shows a flowchart of an example procedure for the storage device of FIG. 1 to download and activate a firmware image, according to embodiments of the disclosure.
Figure 12B:
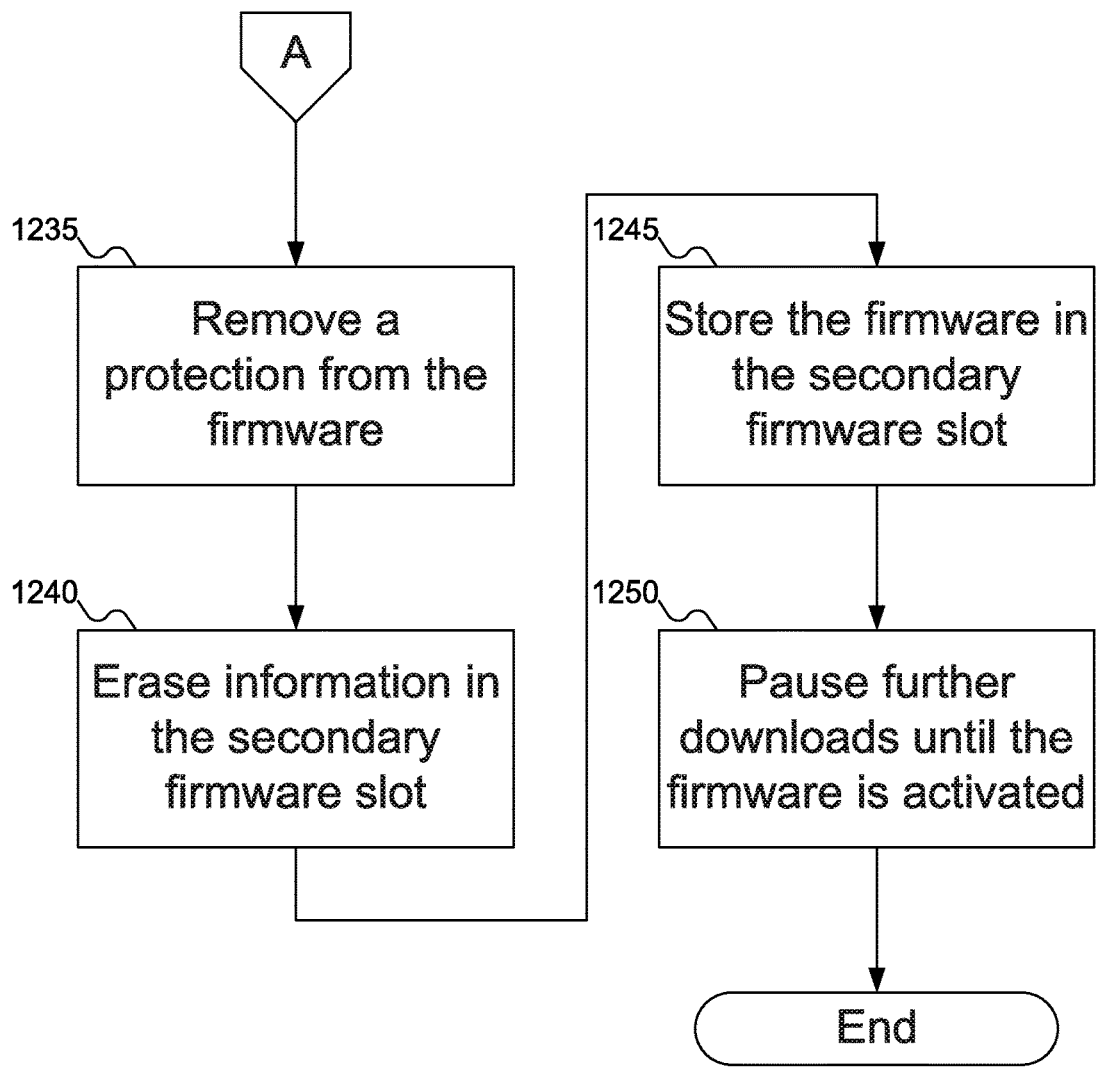
FIG. 12B continues a flowchart of an example procedure for the storage device of FIG. 1 to download and activate a firmware image, according to embodiments of the disclosure.

FIGS. 12A-12B shows a flowchart of an example procedure for storage device 120 of FIG. 1 to download and activate a firmware image, according to embodiments of the disclosure. In FIG. 12A, at block 1205, storage device 120 of FIG. 1 may receive a signal to put storage device 120 of FIG. 1 in a manufacturer mode. For example, storage device 120 of FIG. 1 may receive a signal that may originate from an input external to storage device 120 of FIG. 1, instructing storage device 120 of FIG. 1 to be put in manufacturer mode. As a result of receiving this signal, at block 1210 storage device 120 of FIG. 1 may be put in manufacturer mode. Blocks 1205 and 1210 may be omitted, as shown by dashed line 1215: for example, bootup activation may occur as a result of main firmware download of the firmware (with blocks 1205 and 1210 used when storage device 120 of FIG. 1 is not able to download firmware using the main firmware download process).

At block 1220, firmware downloader 605 of FIG. 6 may download a firmware for storage device 120 of FIG. 1. At block 1225, validator 615 of FIG. 6 may validate that the firmware was successfully downloaded. At block 1230, determiner 630 of FIG. 6 may determine that the firmware supports bootup activation.

At block 1235 (FIG. 12B), protection remover 610 of FIG. 6 may remove a protection from the downloaded firmware. For example, if a digital signature has been applied to the downloaded firmware, the digital signature may be removed so that the firmware image may be modified (such as setting tag 545 of FIG. 5) to reflect that the firmware has been activated. At block 1240, eraser 620 of FIG. 6 may secondary firmware slot 410 of FIG. 4, so that at block 1245 firmware storer 625 of FIG. 6 may store the firmware in secondary firmware slot 410 of FIG. 4. Finally, at block 1250, controller 315 of FIG. 3 may pause any further downloads until after the firmware is activated at bootup.

Figure 13A:
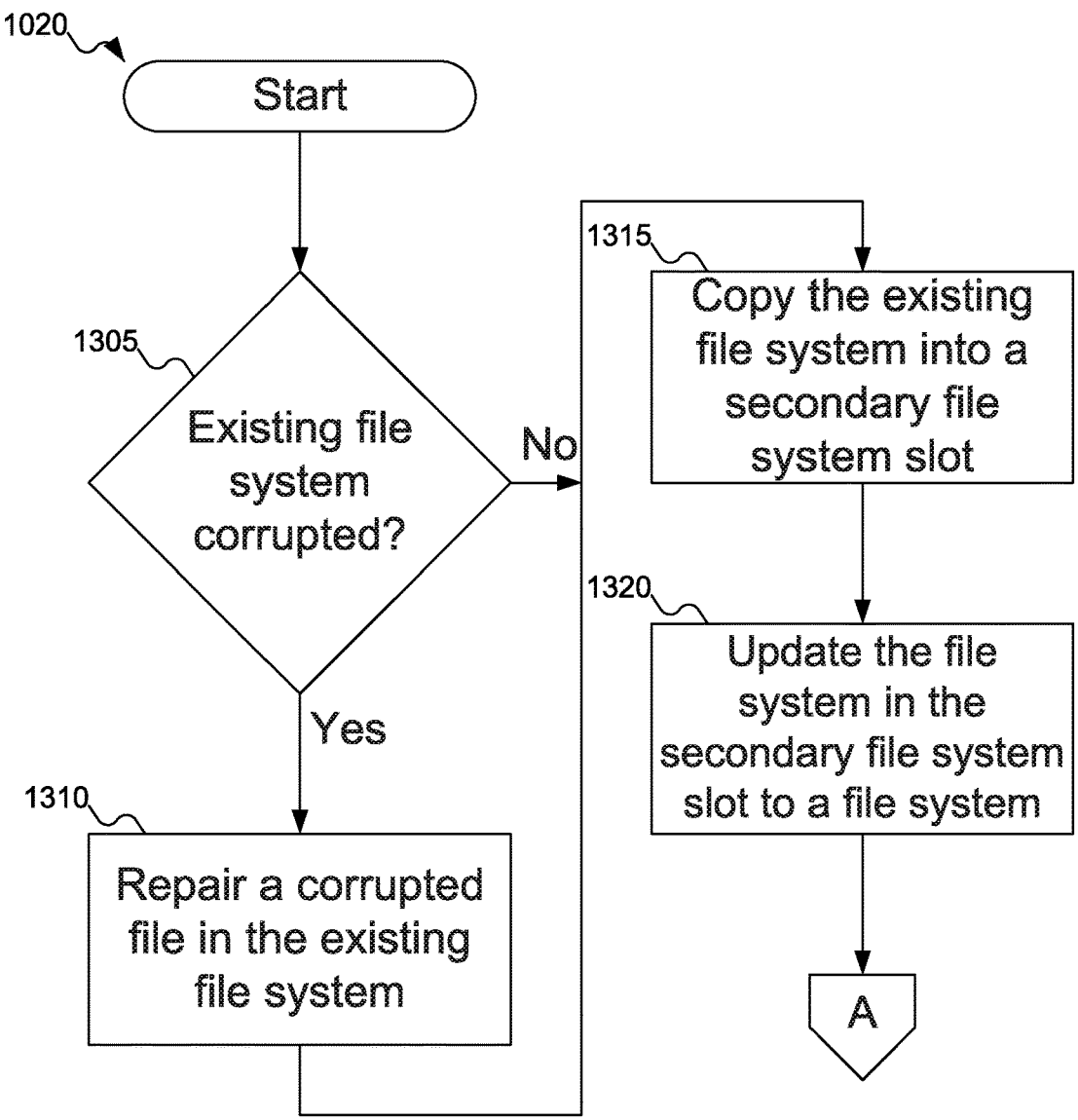
FIG. 13A shows another flowchart of an example procedure for the storage device of FIG. 1 to activate a firmware image, according to embodiments of the disclosure.
Figure 13B:
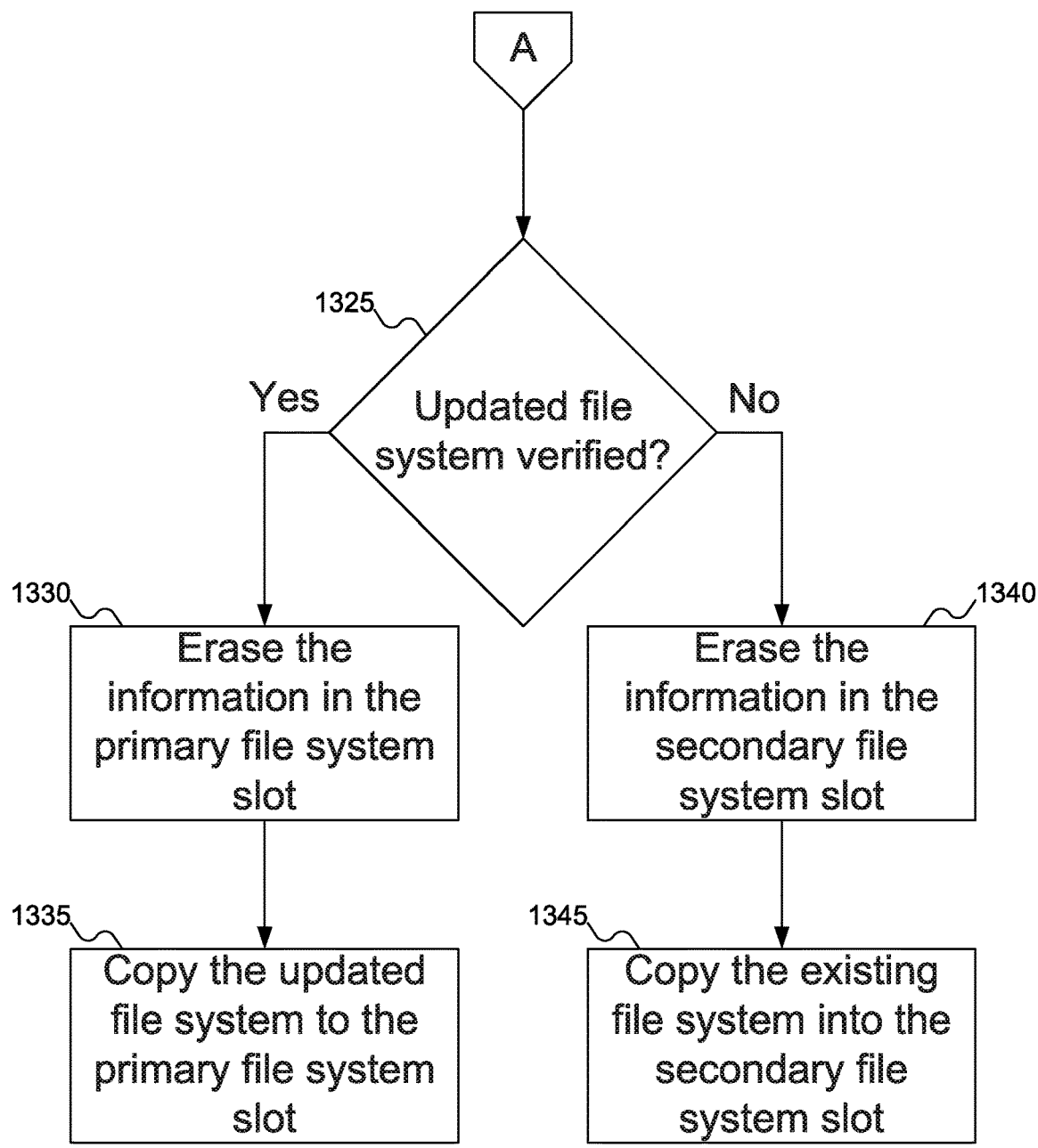
FIG. 13B continues the flowchart of another example procedure for the storage device of FIG. 1 to activate a firmware image, according to embodiments of the disclosure.

FIGS. 13A-13B show another flowchart of an example procedure for storage device 120 of FIG. 1 to activate a firmware image, according to embodiments of the disclosure. In FIG. 13A, at block 1305, verifier 645 of FIG. 6 may determine whether the existing file system (which may be stored in primary file system slot 415 of FIG. 4) is corrupted. If so, then at block 1310 repairer 650 of FIG. 6 may repair the existing file system.

Whether or not the existing file system needed repair (and repair was successfully completed: if repair was not successfully completed, then the firmware image was not successfully activated), at block 1315 file system copier 640 of FIG. 6 may copy the existing file system from primary file system slot 415 of FIG. 4 to secondary file system slot 420 of FIG. 4. At block 1320, updater 655 of FIG. 6 may update the existing file system in secondary file system slot 420 of FIG. 4 to an updated file system. As discussed above, this update may involve format updater 710 of FIG. 7 updating a format of a file in the updated file system and/or file updater 715 of FIG. 7 updating a file in the updated file system.

At block 1325 (FIG. 13B), controller 315 of FIG. 3 may determine whether the updated file system has been verified. If so, then at block 1330, eraser 660 of FIG. 6 may erase information from primary file system slot 415 of FIG. 4, and at block 1335 file system copier 640 of FIG. 6 may copy the updated file system from secondary file system slot 420 of FIG. 4 to primary file system slot 415 of FIG. 4. If not, then at block 1340, eraser 660 of FIG. 6 may erase information from secondary file system slot 420 of FIG. 4, and at block 1345 file system copier 640 of FIG. 6 may copy the existing file system from primary file system slot 415 of FIG. 4 to secondary file system slot 420 of FIG. 4.

Figure 14:
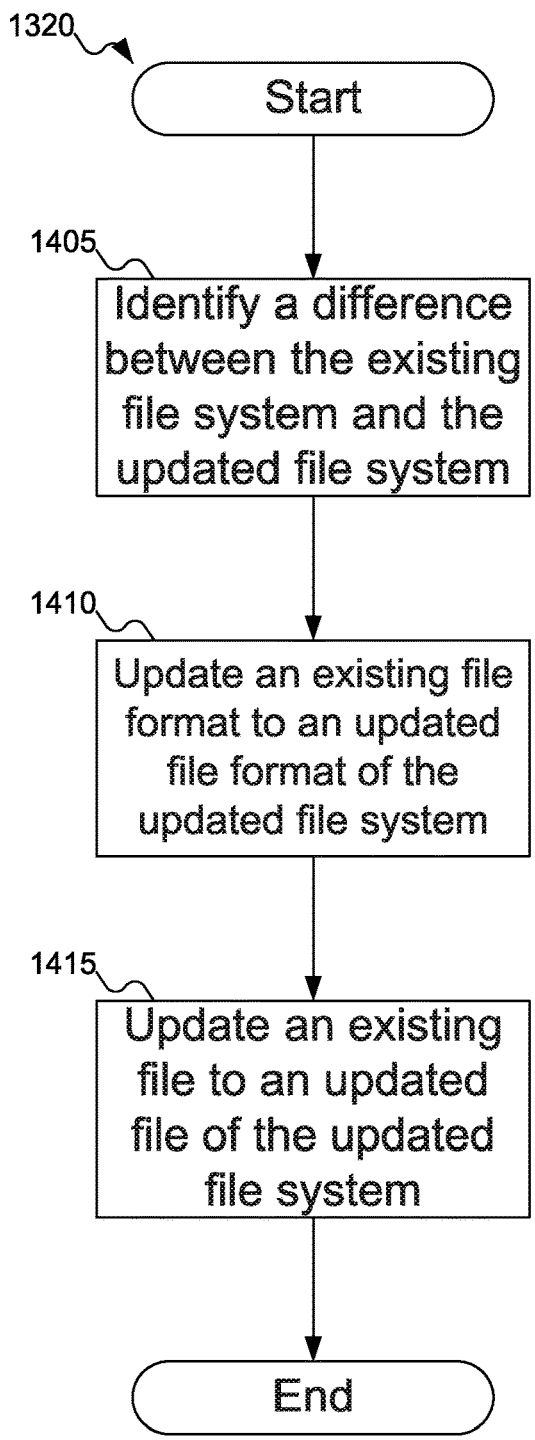
FIG. 14 shows a flowchart of a procedure for the storage device of FIG. 1 to update a file system, according to embodiments of the disclosure.

FIG. 14 shows a flowchart of a procedure for storage device 120 of FIG. 1 to update a file system, according to embodiments of the disclosure. In FIG. 14, at block 1405, difference identifier 705 of FIG. 7 may identify a difference between the existing file system and the updated file system. At block 1410, format updater 710 of FIG. 7 may update a format of a file in the updated file system. Finally, at block 1415, file updater 715 of FIG. 7 may update a file in the updated file system.

Figure 15:
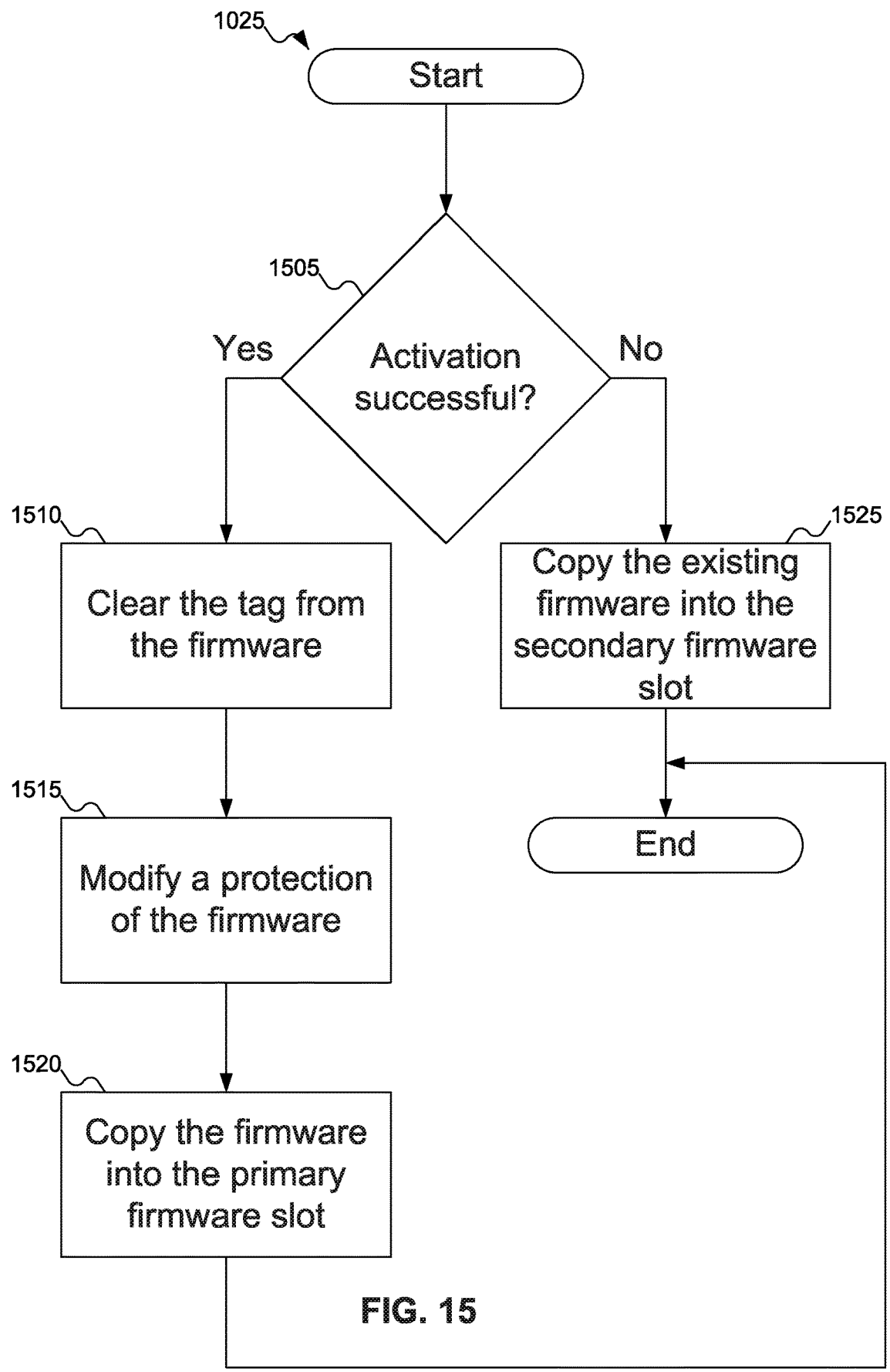
FIG. 15 shows a flowchart of an example procedure for the storage device of FIG. 1 to finish activating a firmware image, according to embodiments of the disclosure.

FIG. 15 shows a flowchart of an example procedure for storage device 120 of FIG. 1 to finish activating a firmware image, according to embodiments of the disclosure. In FIG. 15, at block 1505, activator 635 may determine if activation of the firmware was successful. If so, then at block 1510, tag setter 665 of FIG. 6 may clear tag 545 of FIG. 5 from firmware image 505 of FIG. 5 in secondary firmware slot 410 of FIG. 4, thereby ensuring that firmware image 505 of FIG. 5 in secondary firmware slot 410 of FIG. 4 is not activated again. At block 1515, controller 315 of FIG. 3 may update a protection of firmware image 505 of FIG. 2 to account for tag 545 of FIG. 5 being set. Finally, at block 1520, firmware copier 670 of FIG. 6 may copy the firmware in secondary firmware slot 410 of FIG. 4 to primary firmware slot 405 of FIG. 4. On the other hand, if activation is not successful, then at block 1525, firmware copier 670 of FIG. 6 may copy the existing firmware in primary firmware slot 405 of FIG. 4 to secondary firmware slot 410 of FIG. 4.

In FIGS. 8A-15, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Sometimes, a customer may report a disk failure. Usually, the disk may be brought into a state wherein a version of a firmware image may be downloaded to fix a bug. But sometimes the storage device, such as a Solid State Drive (SSD), may enter a recursive crash dump state, or the file system may be corrupted. In such situations, the storage device might not be able to enter a state where a firmware may be downloaded and activated, or the corrupted file system might not be repairable. The manufacturer may be able to manually or automatically set the storage device into a bootrom mode to download a firmware, but such an operation may erase all firmware system slots. Further, such an operation may erase existing file system data, because existinger file system data might not be compatible with the version of the firmware, and may not be left in place.

To improve storage device operations, a process of firmware activation/file system update—bootup activation at power on—within storage device 120 of FIG. 1 may be used.

This process may also be used when firmware is downloaded under more normal circumstances but activation is to be deferred until the next time the storage device boots (as compared with rebooting the storage device immediately to activate the downloaded firmware).

In order to support bootup activation, at power on, storage device 120 of FIG. 1 may detect the firmware image and switch to an activation process.

The firmware image may be tagged, flagged, or otherwise marked to indicate that activation after bootup may be used. This tag may be detected by either bootrom or main firmware during the download process. The firmware image may include features to enhance the storage device.

In bootrom mode, if the flag indicating that the firmware activation after bootup may be used is detected, the firmware image may be saved to only a secondary firmware slot in storage device 120 of FIG. 1, leaving the primary firmware slot (and the file system) unchanged. In this manner, the storage device may revert to the original disk firmware/file system in case of any error occurring during activation. In some embodiments of the disclosure, the firmware image may be stored somewhere other than the secondary firmware slot, with the firmware image copied into the secondary firmware slot as part of bootup activation.

In main to main firmware downloading, if the flag indicating that the firmware activation after bootup may be used is detected, the firmware image may be saved to only a secondary firmware slot in storage device 120 of FIG. 1. Other commands may be downloaded without further action, and any other download operation may be blocked until the next power cycle (at which time the firmware may be activated). In some embodiments of the disclosure, the firmware image may be stored somewhere other than the secondary firmware slot, with the firmware image copied into the secondary firmware slot as part of bootup activation.

At power on/bootup, the bootrom/bootloader or the main firmware process used in storage device 120 of FIG. 1 may take care of firmware activation. There may also be a tag that indicates whether a firmware has been activated or not: this flag may be the same as or different from the flag indicating that the firmware is to be activated after bootup. This flag may be cleared after activation, so that the firmware would not be activated again after yet another bootup.

When the main firmware in storage device 120 of FIG. 1 detects a firmware image in the secondary firmware slot that requires activation, the main firmware may start a firmware activation process. Embodiments of the disclosure may load the firmware image from the secondary firmware slot rather than the primary firmware slot, and activate the firmware.

The main firmware may switch the storage device from power-on mode to bootup-activation mode, which may include some additional operations.

In some embodiments of the disclosure, the file system in the primary file system slot may be backed up to the secondary file system slot in storage device 120 of FIG. 1. In this manner, if there is a problem with repairing or replacing the file system, any such repair or replacement may be reversed.

In some embodiments of the disclosure, the current file system in the primary slot in storage device 120 of FIG. 1 may be verified/tested to make sure it is workable with the firmware, and without any corruption. A corrupted file system may be repaired, if possible. In such embodiments of the disclosure, the existing file system and the updated file system may be compared. If their data structures or definitions are different, a converting function may be used to update the existing file system to make it compatible with the firmware. The file system volume version may be maintained in its layout, which may be used to detect any differences between the existing file system and the updated file system via the file data structures, and to decide whether to update the existing file system data to make it compatible with the updated file system volume.

In some embodiments of the disclosure, files (such as file system files) in storage device 120 of FIG. 1 may be updated according to a pre-defined policy.

If the file system update is successful, then the version of the firmware image may be copied into the primary firmware slot in storage device 120 of FIG. 1. In some embodiments of the disclosure, if the file system was updated, the updated file system may be copied from the secondary file system slot into the primary file system slot, and set it to be the current file system. At this point, bootup activation may be completed successfully, and the process to complete boot may be continued. If either the file system update was not successful, or the firmware was not successfully activated, the image(s) from the primary slots (firmware and/or file system) may be copied into the secondary slots, reverting the storage device to its earlier configuration.

In some embodiments of the disclosure, the firmware image in storage device 120 of FIG. 1 may include a tag that may indicate that the firmware may be subject to bootup activation. In some embodiments of the disclosure, the firmware image may also include a second tag that may indicate that bootup activation has been performed, so that bootup activation is not repeated. These flags may be the same or different, and may be placed in any desired location within the firmware image.

Storage device 120 of FIG. 1 may include two firmware slots and two file system slots. By including multiple firmware and file system slots, the storage device may store backup copies of the firmware and/or file system. If the information in the primary slot is not readable, the information may then be read from the secondary slot. Embodiments of the disclosure may also include more than two of each type of slots, and there may be different numbers of firmware slots and file system slots.

The firmware image stored in storage device 120 of FIG. 1 may store the firmware in any desired manner. Portions of the firmware may include a parity code, such as a Cyclic Redundancy Check (CRC) or CRC32 code or digitally signed using a signature such as the Rivest-Shamir-Aldeman (RSA) cryptosystem; other parity codes and/or digital signature algorithms may also be used. Tags or flags that may be used to identify that firmware may be subject to bootup activation, and/or indicating whether bootup activation has been performed, may be stored anywhere desired within the firmware image.

Embodiments of the disclosure offer technical advantages over the prior art. Embodiments of the disclosure may enable repair or replacement of either the firmware or file system used in a storage device without the loss of user data on the storage device. Since users prefer to retain their data even in the event of a catastrophic failure (requiring the storage device to be repaired by the manufacturer), a system and method by which such user data may be retained is desirable. Embodiments of the disclosure may operate by using a secondary firmware slot and/or a secondary file system slot in which updates to the firmware and/or file system may be made. If these updates are successful, the updates may be migrated into the primary firmware and/or file system slots; if not, the original firmware and/or file system are still retained, which avoids any potential data loss as a result of a failed attempt to update the firmware and/or file system.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage device, comprising: first storage, including:
 a primary firmware slot to store a first firmware;
 a secondary firmware slot to store a second firmware;
 a primary file system slot to store an existing file system;
 a secondary file system slot;
 a processor configured to execute the first firmware or the second firmware; and
 second storage for user data, the second storage configured to use the existing file system,
 wherein the second firmware includes a tag indicating that the second firmware is subject to bootup activation.

Statement 2. An embodiment of the disclosure includes the storage device according to statement 1, wherein the storage device includes a Solid State Drive (SSD), a hard disk drive, or a device including an embedded storage device.

Statement 3. An embodiment of the disclosure includes the storage device according to statement 1, wherein the storage device is configured to perform bootup activation of the second firmware.

Statement 4. An embodiment of the disclosure includes the storage device according to statement 3, wherein the storage device includes:

a determiner to determine that the second firmware includes the tag indicating that the second firmware is subject to bootup activation; and an activator to activate the second firmware based at least in part on the second firmware including the tag indicating that the second firmware is subject to bootup activation.

Statement 5. An embodiment of the disclosure includes the storage device according to statement 1, wherein the firmware includes a second tag indicating that the second firmware has been activated.

Statement 6. An embodiment of the disclosure includes the storage device according to statement 5, wherein the storage device includes a tag setter to set the tag indicating that the second firmware has been activated based at least in part on successful activation of the second firmware.

Statement 7. An embodiment of the disclosure includes the storage device according to statement 1, wherein the storage device includes a firmware copier to copy the second firmware from the secondary firmware slot to the primary firmware slot based at least in part on successful bootup activation of the second firmware.

Statement 8. An embodiment of the disclosure includes the storage device according to statement 1, wherein the firmware copier is configured to copy the first firmware from the primary firmware slot to the secondary firmware slot based at least in part on unsuccessful bootup activation of the second firmware.

Statement 9. An embodiment of the disclosure includes the storage device according to statement 1, wherein the storage device includes:

a firmware receiver to receive the second firmware from a source; and a firmware storer to store the second firmware in the secondary firmware slot based at least in part on the tag indicating that the second firmware is subject to bootup activation.

Statement 10. An embodiment of the disclosure includes the storage device according to statement 9, wherein:

the storage device is configured to receive an external signal to put the storage device in a manufacturer mode;

the firmware receiver is configured to receive the second firmware from the source by a manufacturer.

Statement 11. An embodiment of the disclosure includes the storage device according to statement 9, wherein the firmware receiver is configured to receive the second firmware from the source by a user.

Statement 12. An embodiment of the disclosure includes the storage device according to statement 9, wherein the storage device includes a protection remover to remove a protection from the second firmware.

Statement 13. An embodiment of the disclosure includes the storage device according to statement 9, further comprising a validator to validate the firmware.

Statement 14. An embodiment of the disclosure includes the storage device according to statement 9, further comprising an eraser to erase information in the secondary firmware slot.

Statement 15. An embodiment of the disclosure includes the storage device according to statement 1, further comprising a verifier to verify that the existing file system is uncorrupted.

Statement 16. An embodiment of the disclosure includes the storage device according to statement 15, further comprising a repairer to repair the existing file system based at least in part on the existing file system being corrupted.

Statement 17. An embodiment of the disclosure includes the storage device according to statement 1, further comprising a file system copier to copy the existing file system from the primary file system slot to the secondary file system slot.

Statement 18. An embodiment of the disclosure includes the storage device according to statement 17, further comprising:

an updater to update the existing file system in the secondary file system slot to a updated file system in the secondary file system slot, wherein the existing file system in the primary file system slot is unchanged.

Statement 19. An embodiment of the disclosure includes the storage device according to statement 18, wherein the updater includes a difference identifier to identify a difference between the updated file system associated with the second firmware and the existing file system.

Statement 20. An embodiment of the disclosure includes the storage device according to statement 18, wherein the updater includes a format updater to update a first file format of the existing file system to a second file format of the updated file system.

Statement 21. An embodiment of the disclosure includes the storage device according to statement 18, wherein the updater includes a file updater to update a first file of the existing file system to a second file of the updated file system.

Statement 22. An embodiment of the disclosure includes the storage device according to statement 18, wherein the file system copier is configured to copy the updated file system from the secondary file system slot to the primary file system slot.

Statement 23. An embodiment of the disclosure includes the storage device according to statement 22, wherein the file system copier is configured to copy the updated file system from the secondary file system slot to the primary file system slot based at least in part on verifying the updated file system.

Statement 24. An embodiment of the disclosure includes the storage device according to statement 18, further comprising an eraser to erase the updated file system from the secondary file system slot based at least in part on not verifying the updated file system.

Statement 25. An embodiment of the disclosure includes the storage device according to statement 24, wherein the file system copier is configured to copy the existing file system from the primary file system slot to the secondary file system slot.

Statement 26. An embodiment of the disclosure includes a method, comprising:

identifying a first firmware is stored in a primary firmware slot in a storage device;

identifying a second firmware stored in a secondary firmware slot in the storage device;

determining that the second firmware is tagged for bootup activation;

attempting to activate the second firmware; and unifying the second firmware and the first firmware in the storage device.

Statement 27. An embodiment of the disclosure includes the method according to statement 26, wherein attempting to activate the second firmware includes attempting to activate the second firmware at bootup.

Statement 28. An embodiment of the disclosure includes the method according to statement 26, wherein the storage device includes a Solid State Drive (SSD), a hard disk drive, or a device including an embedded storage device.

Statement 29. An embodiment of the disclosure includes the method according to statement 26, wherein determining that the second firmware is tagged for bootup activation includes identifying a field in the second firmware, the field a tag indicating that the second firmware is to be activated.

Statement 30. An embodiment of the disclosure includes the method according to statement 26, wherein, unifying the second firmware and the first firmware in the storage device includes copying the second firmware from the secondary firmware slot into the primary firmware slot based at least in part on successful bootup activation of the second firmware.

Statement 31. An embodiment of the disclosure includes the method according to statement 30, wherein unifying the second firmware and the first firmware in the storage device further includes clearing a tag indicating that the second firmware is to be activated from the second firmware based at least in part on successful bootup activation of the second firmware.

Statement 32. An embodiment of the disclosure includes the method according to statement 31, wherein clearing the tag indicating that the second firmware is to be activated from the second firmware includes modifying a protection of the second firmware.

Statement 33. An embodiment of the disclosure includes the method according to statement 26, wherein unifying the second firmware and the first firmware in the storage device includes copying the first firmware from the primary firmware slot into the secondary firmware slot based at least in part on unsuccessful bootup activation of the second firmware.

Statement 34. An embodiment of the disclosure includes the method according to statement 26, further comprising:
downloading the second firmware into the storage device; and
storing the second firmware in the secondary firmware slot in the storage device.

Statement 35. An embodiment of the disclosure includes the method according to statement 34, wherein:
the method further comprises putting the storage device in a manufacturer mode; and
downloading the second firmware into the storage device includes downloading the second firmware into the storage device by a manufacturer.

Statement 36. An embodiment of the disclosure includes the method according to statement 35, wherein putting the storage device in the manufacturer mode includes receiving a signal to put the storage device in a manufacturer mode.

Statement 37. An embodiment of the disclosure includes the method according to statement 36, wherein receiving the signal to put the storage device in the manufacturer mode includes receiving the signal to put the storage device in the manufacturer mode from an external source.

Statement 38. An embodiment of the disclosure includes the method according to statement 34, wherein storing the second firmware in the secondary firmware slot in the storage device includes determining that the second firmware supports bootup activation.

Statement 39. An embodiment of the disclosure includes the method according to statement 34, wherein storing the second firmware in the secondary firmware slot includes removing a protection from the second firmware.

Statement 40. An embodiment of the disclosure includes the method according to statement 34, wherein downloading the second firmware into the storage device includes downloading the second firmware into the storage device by a user.

Statement 41. An embodiment of the disclosure includes the method according to statement 40, further comprising pausing further downloads based at least in part on the second firmware not being activated.

Statement 42. An embodiment of the disclosure includes the method according to statement 34, wherein:
the method further comprises validating the second firmware; and
storing the second firmware in the secondary firmware slot in the storage device includes storing the second firmware in the secondary firmware slot in the storage device based at least in part on successful validation of the second firmware.

Statement 43. An embodiment of the disclosure includes the method according to statement 34, wherein storing the second firmware in the secondary firmware slot in the storage device includes erasing information in the secondary firmware slot.

Statement 44. An embodiment of the disclosure includes the method according to statement 26, wherein attempting to activate the second firmware includes verifying that an existing file system of the storage device is uncorrupted.

Statement 45. An embodiment of the disclosure includes the method according to statement 44, wherein verifying that the existing file system of the storage device is uncorrupted includes repairing a corrupted file in the existing file system based at least in part on the existing file system of the storage device being corrupted.

Statement 46. An embodiment of the disclosure includes the method according to statement 26, wherein attempting to activate the second firmware includes copying an existing file system from a primary file system slot to a secondary file system slot.

Statement 47. An embodiment of the disclosure includes the method according to statement 46, further comprising:
updating the existing file system in the secondary file system slot to a updated file system in the secondary file system slot,
wherein the existing file system in the primary file system slot is unchanged.

Statement 48. An embodiment of the disclosure includes the method according to statement 47, wherein updating the existing file system in the secondary file system slot to the updated file system in the secondary file system slot includes identifying a difference between the updated file system associated with the second firmware and the existing file system.

Statement 49. An embodiment of the disclosure includes the method according to statement 47, wherein updating the existing file system in the secondary file system slot to the updated file system in the secondary file system slot includes updating a first file format of the existing file system to a second file format of the updated file system.

Statement 50. An embodiment of the disclosure includes the method according to statement 47, wherein updating the existing file system in the secondary file system slot to the updated file system in the secondary file system slot includes updating a first file of the existing file system to a second file of the updated file system.

Statement 51. An embodiment of the disclosure includes the method according to statement 47, further comprising copying the updated file system from the secondary file system slot to the primary file system slot.

Statement 52. An embodiment of the disclosure includes the method according to statement 51, wherein copying the updated file system from the secondary file system slot to the primary file system slot includes copying the updated file system from the secondary file system slot to the primary file system slot based at least in part on verifying the updated file system.

Statement 53. An embodiment of the disclosure includes the method according to statement 47, further comprising erasing the updated file system from the secondary file system slot based at least in part on not verifying the updated file system.

Statement 54. An embodiment of the disclosure includes the method according to statement 53, further comprising copying the existing file system from the primary file system slot to the secondary file system slot.

Statement 55. An embodiment of the disclosure includes an article, comprising a non-transitory storage medium, the non-transitory storage medium having stored thereon instructions that, when executed by a machine, result in:

identifying a first firmware is stored in a primary firmware slot in a storage device;

identifying a second firmware stored in a secondary firmware slot in the storage device;

determining that the second firmware is tagged for bootup activation;

attempting to activate the second firmware; and unifying the second firmware and the first firmware in the storage device.

Statement 56. An embodiment of the disclosure includes the article according to statement 55, wherein attempting to activate the second firmware includes attempting to activate the second firmware at bootup.

Statement 57. An embodiment of the disclosure includes the article according to statement 55, wherein the storage device includes a Solid State Drive (SSD), a hard disk drive, or a device including an embedded storage device.

Statement 58. An embodiment of the disclosure includes the article according to statement 55, wherein determining that the second firmware is tagged for bootup activation includes identifying a field in the second firmware, the field a tag indicating that the second firmware is to be activated.

Statement 59. An embodiment of the disclosure includes the article according to statement 55, wherein, unifying the second firmware and the first firmware in the storage device includes copying the second firmware from the secondary firmware slot into the primary firmware slot based at least in part on successful bootup activation of the second firmware.

Statement 60. An embodiment of the disclosure includes the article according to statement 59, wherein unifying the second firmware and the first firmware in the storage device further includes clearing a tag indicating that the second firmware is to be activated from the second firmware based at least in part on successful bootup activation of the second firmware.

Statement 61. An embodiment of the disclosure includes the article according to statement 60, wherein clearing the tag indicating that the second firmware is to be activated from the second firmware includes modifying a protection of the second firmware.

Statement 62. An embodiment of the disclosure includes the article according to statement 55, wherein unifying the second firmware and the first firmware in the storage device includes copying the first firmware from the primary firmware slot into the secondary firmware slot based at least in part on unsuccessful bootup activation of the second firmware.

Statement 63. An embodiment of the disclosure includes the article according to statement 55, the non-transitory storage medium having stored thereon further instructions that, when executed by the machine, result in:

downloading the second firmware into the storage device; and storing the second firmware in the secondary firmware slot in the storage device.

Statement 64. An embodiment of the disclosure includes the article according to statement 63, wherein:

the non-transitory storage medium has stored thereon further instructions that, when executed by the machine, result in putting the storage device in a manufacturer mode; and downloading the second firmware into the storage device includes downloading the second firmware into the storage device by a manufacturer.

Statement 65. An embodiment of the disclosure includes the article according to statement 64, wherein putting the storage device in the manufacturer mode includes receiving a signal to put the storage device in a manufacturer mode.

Statement 66. An embodiment of the disclosure includes the article according to statement 65, wherein receiving the signal to put the storage device in the manufacturer mode includes receiving the signal to put the storage device in the manufacturer mode from an external source.

Statement 67. An embodiment of the disclosure includes the article according to statement 63, wherein storing the second firmware in the secondary firmware slot in the storage device includes determining that the second firmware supports bootup activation.

Statement 68. An embodiment of the disclosure includes the article according to statement 63, wherein storing the second firmware in the secondary firmware slot includes removing a protection from the second firmware.

Statement 69. An embodiment of the disclosure includes the article according to statement 63, wherein downloading the second firmware into the storage device includes downloading the second firmware into the storage device by a user.

Statement 70. An embodiment of the disclosure includes the article according to statement 69, the non-transitory storage medium having stored thereon further instructions that, when executed by the machine, result in pausing further downloads based at least in part on the second firmware not being activated.

Statement 71. An embodiment of the disclosure includes the article according to statement 63, wherein:

the non-transitory storage medium has stored thereon further instructions that, when executed by the machine, result in validating the second firmware; and storing the second firmware in the secondary firmware slot in the storage device includes storing the second firmware in the secondary firmware slot in the storage device based at least in part on successful validation of the second firmware.

Statement 72. An embodiment of the disclosure includes the article according to statement 63, wherein storing the second firmware in the secondary firmware slot in the storage device includes erasing information in the secondary firmware slot.

Statement 73. An embodiment of the disclosure includes the article according to statement 55, wherein attempting to activate the second firmware includes verifying that an existing file system of the storage device is uncorrupted.

Statement 74. An embodiment of the disclosure includes the article according to statement 73, wherein verifying that the existing file system of the storage device is uncorrupted includes repairing a corrupted file in the existing file system based at least in part on the existing file system of the storage device being corrupted.

Statement 75. An embodiment of the disclosure includes the article according to statement 55, wherein attempting to activate the second firmware includes copying an existing file system from a primary file system slot to a secondary file system slot.

Statement 76. An embodiment of the disclosure includes the article according to statement 75, the non-transitory storage medium having stored thereon further instructions that, when executed by the machine, result in:

updating the existing file system in the secondary file system slot to a updated file system in the secondary file system slot, wherein the existing file system in the primary file system slot is unchanged.

Statement 77. An embodiment of the disclosure includes the article according to statement 76, wherein updating the existing file system in the secondary file system slot to the updated file system in the secondary file system slot includes identifying a difference between the updated file system associated with the second firmware and the existing file system.

Statement 78. An embodiment of the disclosure includes the article according to statement 76, wherein updating the existing file system in the secondary file system slot to the updated file system in the secondary file system slot includes updating a first file format of the existing file system to a second file format of the updated file system.

Statement 79. An embodiment of the disclosure includes the article according to statement 76, wherein updating the existing file system in the secondary file system slot to the updated file system in the secondary file system slot includes updating a first file of the existing file system to a second file of the updated file system.

Statement 80. An embodiment of the disclosure includes the article according to statement 76, the non-transitory storage medium having stored thereon further instructions that, when executed by the machine, result in copying the updated file system from the secondary file system slot to the primary file system slot.

Statement 81. An embodiment of the disclosure includes the article according to statement 80, wherein copying the updated file system from the secondary file system slot to the primary file system slot includes copying the updated file system from the secondary file system slot to the primary file system slot based at least in part on verifying the updated file system.

Statement 82. An embodiment of the disclosure includes the article according to statement 76, the non-transitory storage medium having stored thereon further instructions that, when executed by the machine, result in erasing the updated file system from the secondary file system slot based at least in part on not verifying the updated file system.

Statement 83. An embodiment of the disclosure includes the article according to statement 82, the non-transitory storage medium having stored thereon further instructions that, when executed by the machine, result in copying the existing file system from the primary file system slot to the secondary file system slot.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage device, comprising:
   first storage, including:
   a primary firmware slot to store a first firmware;
   a secondary firmware slot to store a second firmware;
   a primary file system slot to store an existing file system;
   a secondary file system slot;
   a processor configured to execute the first firmware or the second firmware; and
   second storage for user data, the second storage configured to use the existing file system,
   wherein the second firmware includes a tag indicating that the second firmware is subject to bootup activation,
   wherein the storage device is configured to unify the first firmware and the second firmware based at least in part on a result of bootup activation.

2. The storage device according to claim 1, wherein the storage device is configured to perform bootup activation of the second firmware.

3. The storage device according to claim 2, wherein the storage device includes:
   a determiner to determine that the second firmware includes the tag indicating that the second firmware is subject to bootup activation; and
   an activator to activate the second firmware based at least in part on the second firmware including the tag indicating that the second firmware is subject to bootup activation.

4. The storage device according to claim 1, wherein the storage device includes:
   a firmware receiver to receive the second firmware from a source; and
   a firmware storer to store the second firmware in the secondary firmware slot based at least in part on the tag indicating that the second firmware is subject to bootup activation.

5. The storage device according to claim 1, further comprising a file system copier to copy the existing file system from the primary file system slot to the secondary file system slot.

6. A method, comprising:
   identifying a first firmware is stored in a primary firmware slot in a storage device;
   identifying a second firmware stored in a secondary firmware slot in the storage device;
   determining that the second firmware is tagged for bootup activation;
   attempting to activate the second firmware;
   unifying the second firmware and the first firmware in the storage device based at least in part on a result of attempting to activate the second firmware; and
   changing a portion of the second firmware based at least in part on activating the second firmware.

7. The method according to claim 6, wherein attempting to activate the second firmware includes attempting to activate the second firmware at bootup.

8. The method according to claim 6, further comprising:
   downloading the second firmware into the storage device; and
   storing the second firmware in the secondary firmware slot in the storage device.

9. The method according to claim 8, wherein storing the second firmware in the secondary firmware slot in the storage device includes determining that the second firmware supports bootup activation.

10. The method according to claim 8, wherein:
    the method further comprises validating the second firmware; and storing the second firmware in the secondary firmware slot in the storage device includes storing the second firmware in the secondary firmware slot in the storage device based at least in part on successful validation of the second firmware.

11. The method according to claim 6, wherein attempting to activate the second firmware includes verifying that an existing file system of the storage device is uncorrupted.

12. The method according to claim 11, wherein verifying that the existing file system of the storage device is uncorrupted includes repairing a corrupted file in the existing file system based at least in part on the existing file system of the storage device being corrupted.

13. The method according to claim 6, wherein attempting to activate the second firmware includes copying an existing file system from a primary file system slot to a secondary file system slot.

14. The method according to claim 13, further comprising:
  updating the existing file system in the secondary file system slot to an updated file system in the secondary file system slot,
  wherein the existing file system in the primary file system slot is unchanged.

15. An article, comprising a non-transitory storage medium, the non-transitory storage medium having stored thereon instructions that, when executed by a machine, result in:
  identifying a first firmware is stored in a primary firmware slot in a storage device;
  identifying a second firmware stored in a secondary firmware slot in the storage device;
  determining that the second firmware is tagged for bootup activation;
  attempting to activate the second firmware;
  unifying the second firmware and the first firmware in the storage device based at least in part on a result of attempting to activate the second firmware; and
  changing a portion of the second firmware based at least in part on activating the second firmware.

16. The article according to claim 15, wherein determining that the second firmware is tagged for bootup activation includes identifying a field in the second firmware, the field including a tag indicating that the second firmware is to be activated.

17. The article according to claim 15, the non-transitory storage medium having stored thereon further instructions that, when executed by the machine, result in:
  downloading the second firmware into the storage device; and
  storing the second firmware in the secondary firmware slot in the storage device.

18. The article according to claim 15, wherein attempting to activate the second firmware includes copying an existing file system from a primary file system slot to a secondary file system slot.

19. The article according to claim 18, the non-transitory storage medium having stored thereon further instructions that, when executed by the machine, result in:
  updating the existing file system in the secondary file system slot to an updated file system in the secondary file system slot,
  wherein the existing file system in the primary file system slot is unchanged.

* * * * *